United States Patent [19]
Kaufman et al.

[11] Patent Number: 5,101,475
[45] Date of Patent: Mar. 31, 1992

[54] METHOD AND APPARATUS FOR GENERATING ARBITRARY PROJECTIONS OF THREE-DIMENSIONAL VOXEL-BASED DATA

[75] Inventors: Arie E. Kaufman, Plainview, N.Y.; Solomon E. Shimony, Providence, R.I.

[73] Assignee: The Research Foundation of State University of New York, Albany, N.Y.

[21] Appl. No.: 339,438

[22] Filed: Apr. 17, 1989

[51] Int. Cl.$^5$ ............................................. G06F 15/62
[52] U.S. Cl. .................................... 395/124; 395/127
[58] Field of Search .................. 364/522, 521, 413.19, 364/413.22

[56] References Cited

U.S. PATENT DOCUMENTS 4,674,046  6/1987  Ozeki et al. ...................... 364/522 X
4,879,668  11/1989  Cline et al. ........................... 364/522
4,882,683  11/1989  Rupp et al. .......................... 364/521

OTHER PUBLICATIONS

"A Generalized Object Display Processor Architecture", by S. M. Goldwasser in *I.E.E.E. Computer Graphics and Applications*, vol. 4, No. 10, at pp. 43-55, 1984.

"The Graphics PARCUM (Processing Architecture Based on Cubic Memory) System: A 3-D Memory Based Computer Architecture for Processing and Display of Solid Models" by D. Jackel, published in *Computer Graphics Forum*, North Holland, vol. 4, No. 4, at pp. 21-32, 1985.

"A 3-D Cellular Frame Buffer," by Arie Kaufman and R. Bakalash, Nice, France, in *Proc. Eurographics* '85, on pp. 215-220, Sep. '85.

"Memory Organization for a Cubic Frame Buffer," by Arie Kaufman, in *Proc. Eurographics* '86, Lisbon, Portugal, pp. 93-100, Aug. '86.

"Towards a 3-D Graphics Workstation," by Arie Kaufman, pp. 17-26, 1987, *Advances in Graphics Hardware I*, W. Strasser (Ed.), Springer-Verlag.

"Voxel-Based Architectures for Three-Dimensional Graphics," by Arie Kaufman, in *Proc. IFIP* '86, 10th World Computer Congress, Dublin, Ireland, pp. 361-366, Sep. '86.

"CUBE-An Architecture Based on a 3-D Voxel Map," by Arie Kaufman and R. Bakalash, in *Theoretical Foundations of Computer Graphics and CAD*, R. A. Earnshaw (Ed.), Springer-Verlag, pp. 689-701, 1988.

"A Three-Dimensional Display Method for Voxel-Based Representations" by T. Ohashi, et al., *Proc. Eurographics* '85, pp. 221-232, Sep. '85.

*Primary Examiner*—Gary V. Harkcom
*Assistant Examiner*—Mark K. Zimmerman
*Attorney, Agent, or Firm*—Hoffmann & Baron

[57] ABSTRACT

A device for generating parallel and perspective projections of 3-D voxel-based images, viewed along arbitrary viewing directions. The method involves using retrieval parameters to retrieve voxels of the 3-D voxel-based image from discrete 3-D voxel space. Then, the 3-D voxel-based image is viewed along an arbitrary viewing direction specified by viewing parameters in a manner independent of the retrieval parameters. Apparatus is also provided using a 3-D voxel-based image viewed along an arbitrary viewing direction specified by viewing parameters in a manner independent of the retrieval parameters. Apparatus is also provided utilizing a 3-D memory storage device organized in accordance with a 3-D skewed memory storage scheme, and providing for conflict-free retrieval of voxel-based retrieval rays along a retrieval direction of the memory storage device.

24 Claims, 25 Drawing Sheets

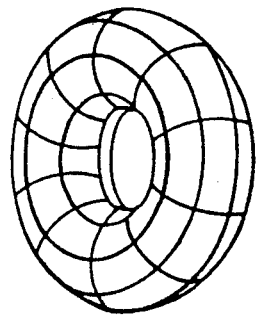
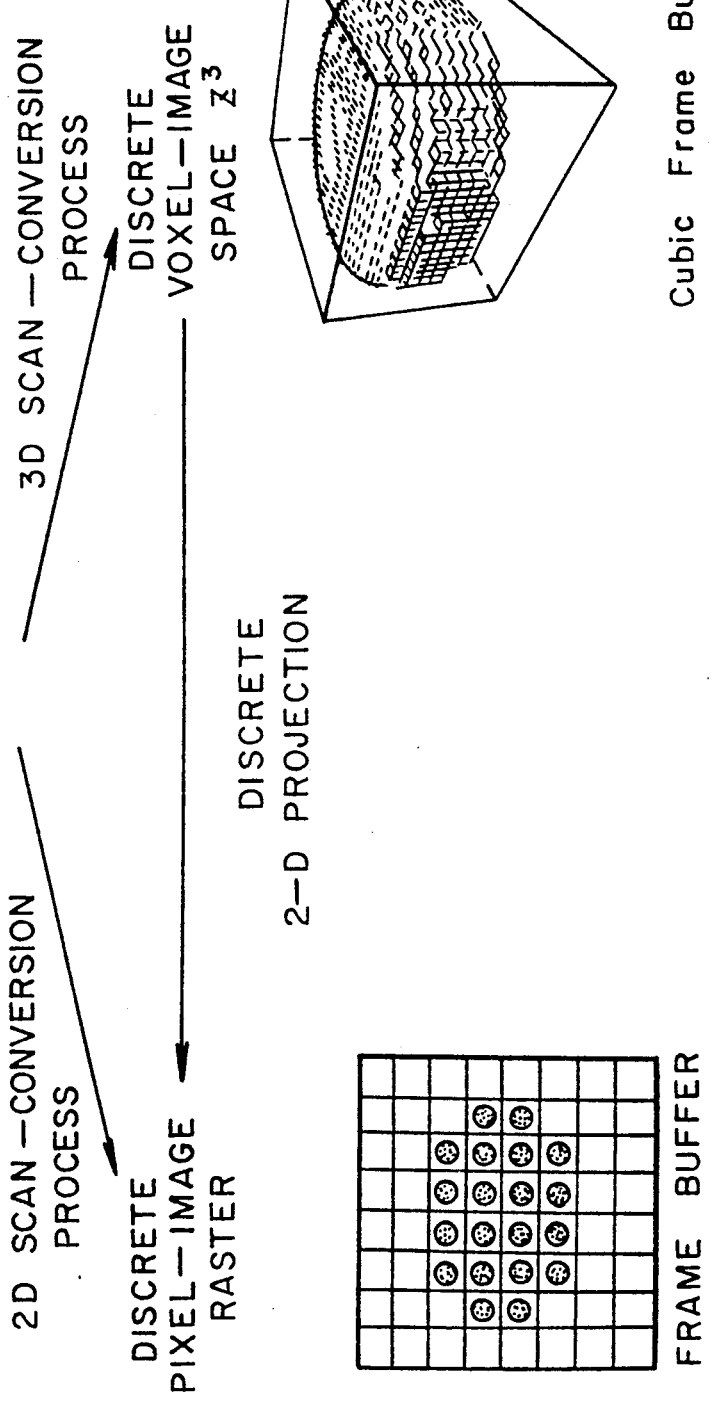
FIG. 3

Memory Module 0 (K=0)

Memory Module 1 (K=1)

Memory Module 2 (K=2)

Memory Module 3 (K=3)

3-D Voxel Space $Z^3$

3-D Voxel Space $Z^3$

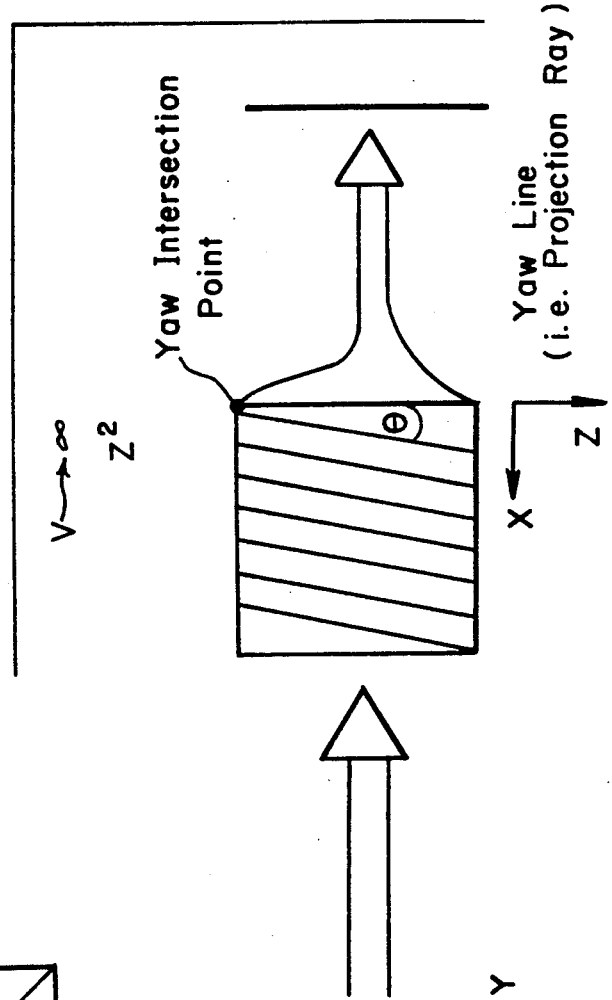
FIG. 6H
FIG. 6F
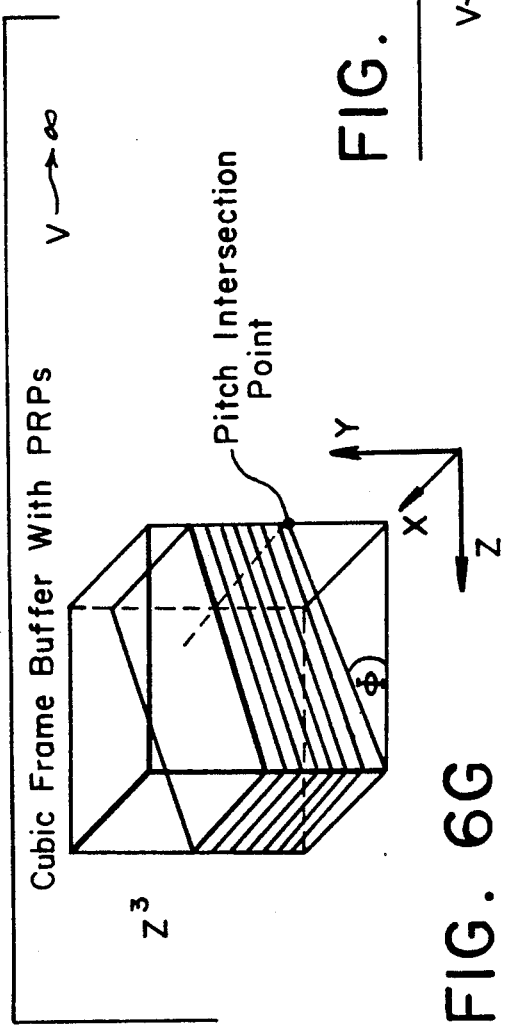
FIG. 6G

Viewing Along Arbitrary Parallel And Perspective Viewing Directions, Independent of Retrieval Parameters

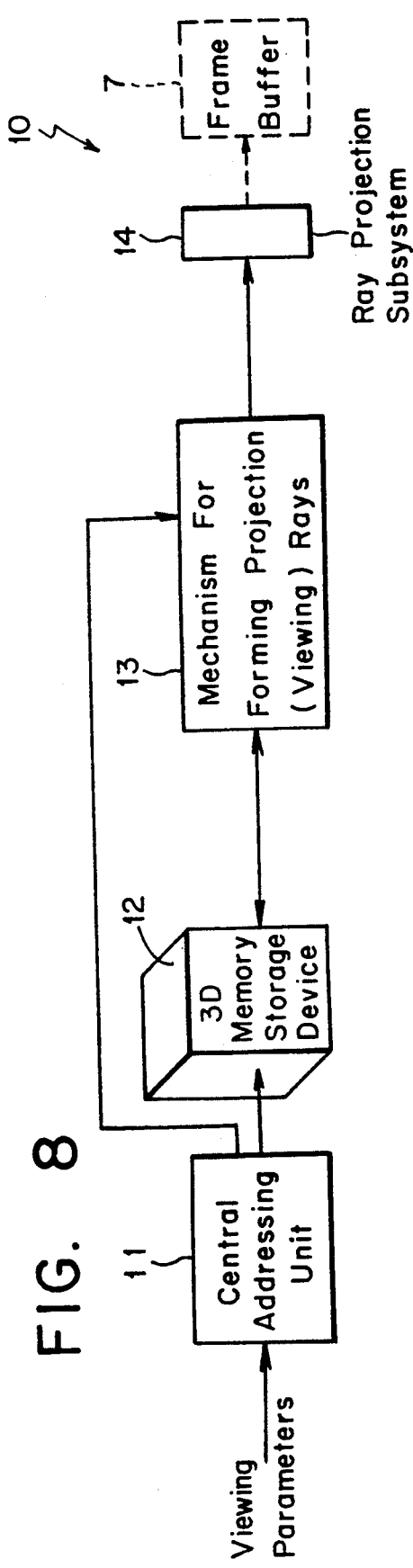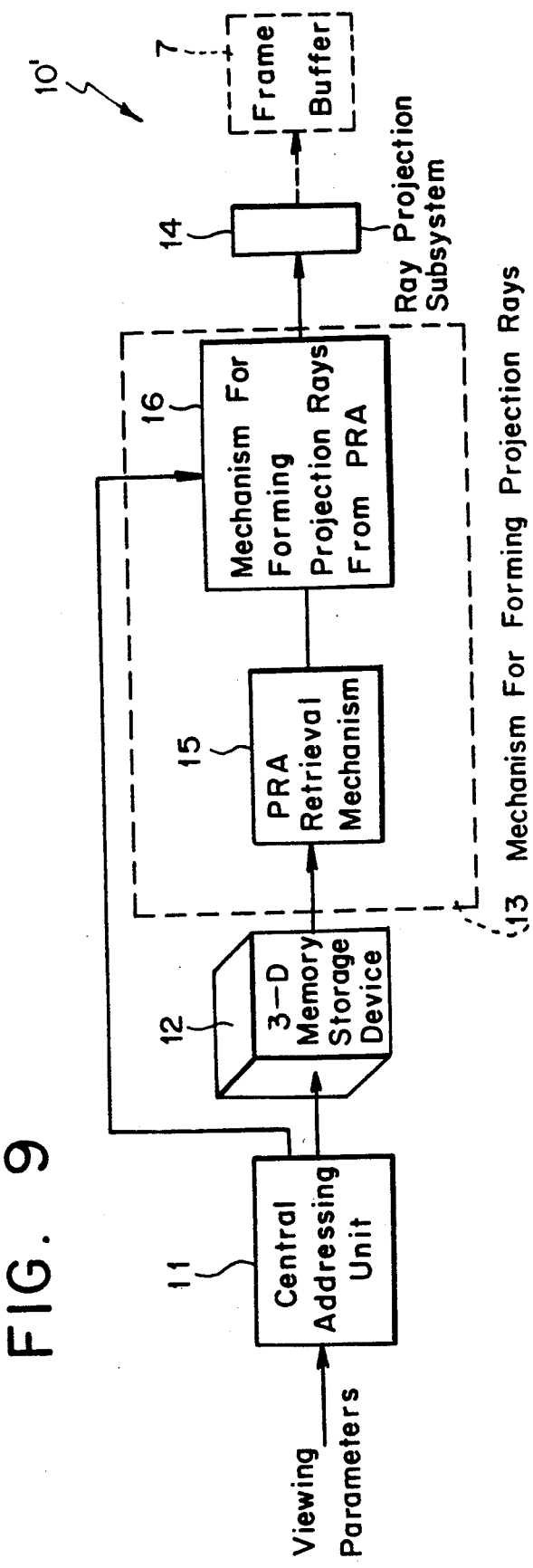

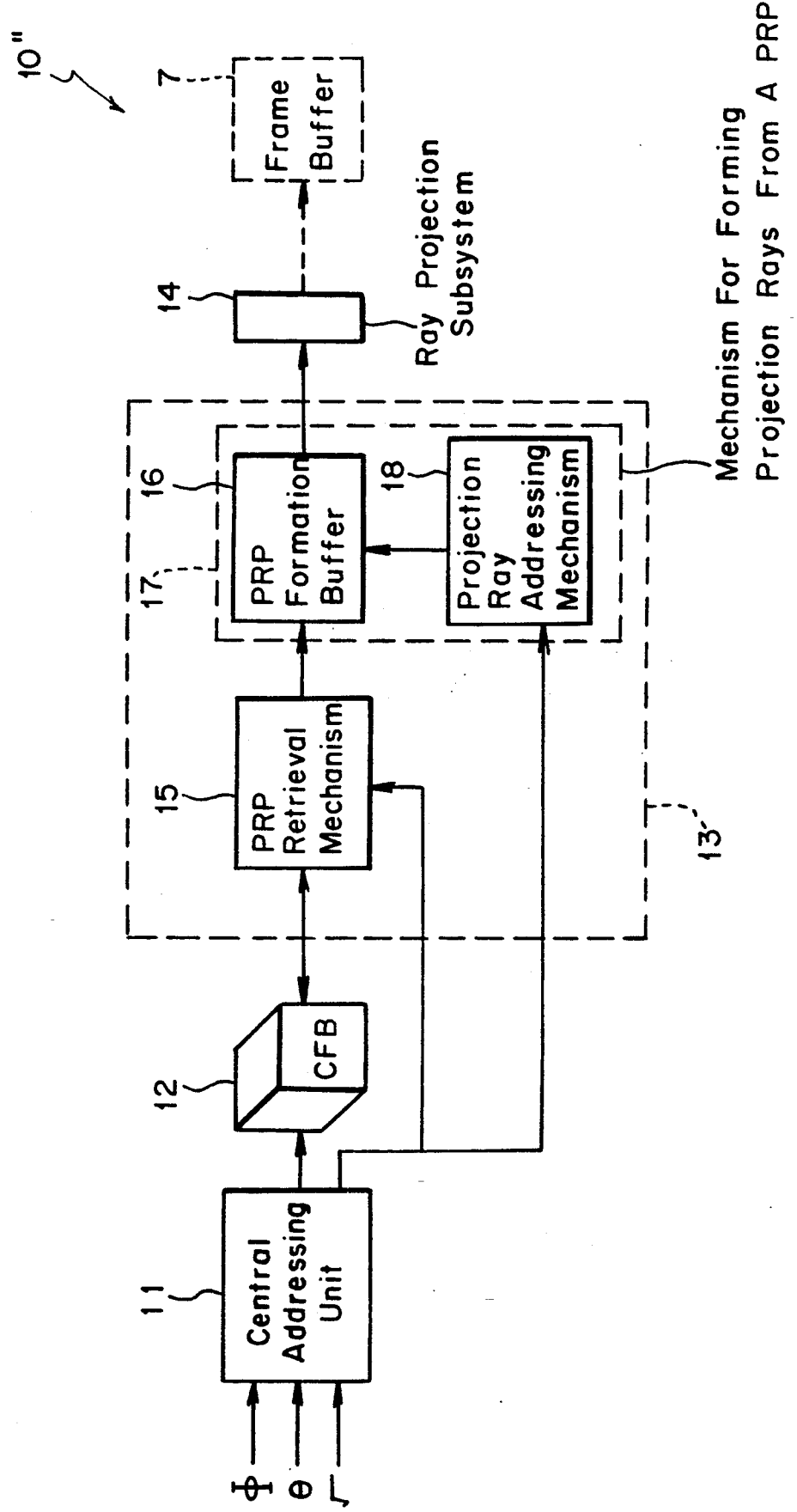

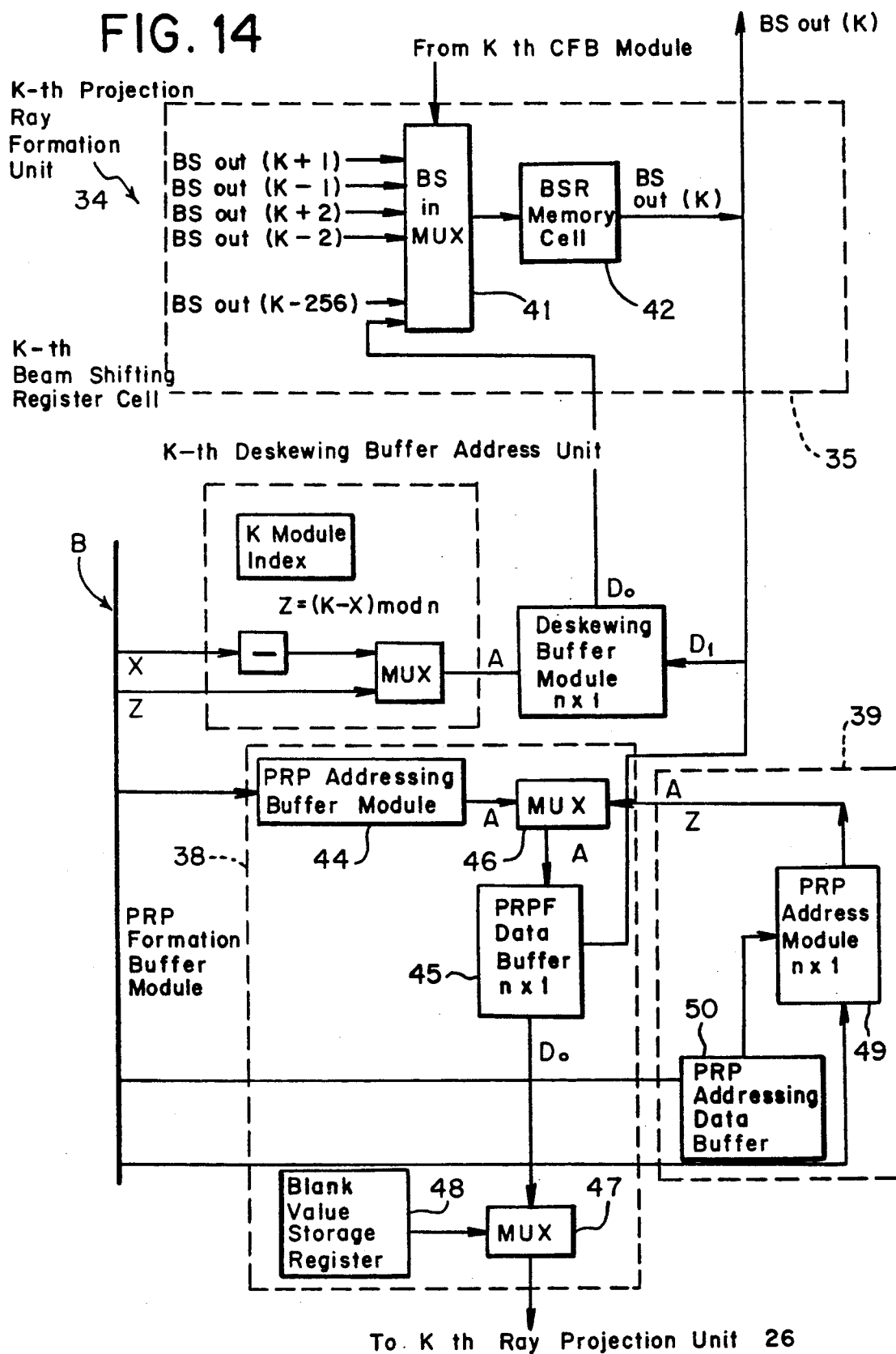

ActivateRealBresenham($l_1$, $\Delta\zeta$, $\Delta l$, *IndexArray*)
    long   $l_1$,                           "scaled secondary direction at CFB 'wall'"
              $\Delta\zeta$,                        "grid size"
              $\Delta l$;                        "scaled step in the secondary direction"
{
    long   $\epsilon$, $\Delta\alpha$, $\Delta\beta$;

$l = \frac{l_1}{\Delta\zeta} + \frac{n}{2} + \frac{1}{2}$;        "integer part of $l_1$ + shift of center + rounding"

$l_1 = l_1 \bmod \Delta\zeta$,          "fraction part of $l_1$"
    if($2l_1 \geq \Delta\zeta$)             "if fraction is $\geq$ 1/2 grid size"
        $l_1 \mathrel{-}= \Delta\zeta$,          "round to next grid point"
    if($\Delta l < 0$){             "reverse stepping"
        $l_1 = -l_1$;
        $l_{inc} = -1$;
        $\Delta l = -\Delta l$;
    }
    else
        $l_{inc} = 1$;
    $\epsilon = 2(\Delta l + l_1) - \Delta\zeta$;       "tracking error"
    $\Delta\alpha = 2\Delta l$;                "tracking error increment"
    $\Delta\beta = 2(\Delta l + \Delta\zeta)$;        "tracking error increment"
    RealBresenham($\epsilon$, $\Delta\alpha$, $\Delta\beta$, $l$, $l_{inc}$, 0, n, 0, n, *IndexArray*);
}

Initializing and Activating RealBresenham Algorithm

FIG. 17

```
RealBresenham(ε, Δα, Δβ, l, ζₛ, ζf, lmin, lmax, linc, OutVector)
        long    ε,                  "tracking error decision variable"
                Δα, Δβ;             "corrections added to ε"
        int     l,                  "integer part of start coordinate"
                ζₛ, ζf,             "prime direction start & end ordinate"
                lmin, lmax,         "CFB limits in the secondary direction"
                linc,               "increment direction ± 1"
               *OutVector           "linear array to store l steps"
{
        for (ζ = ζₛ ; ζ < ζf ; ζ++){
            if(ε > 0){
                    l+= linc;
                    ε+= Δβ;
            }
            else
                    ε+= Δα;
            if(l > lmin    &&    l < lmax)
                    OutVector[ζ] = l;
            else
                    OutVector[ζ] = Illegal;    "indicating out of range"
        }
}
```

Bresenham's Algorithm Modified for Non-Integer Endpoints

FIG. 18

```
ProjectPRP(IndexVector, j){
    "Phase I: Fetch the entire PRP from the CFB to the RB"
    for(k = 0; k < n; k++){                "for each beam"
        lj = IndexVector[k];
        fCFB(l, k, XdirectionBeam);
        rBS(-l);
        sRB(k, XdirectionBeam);
    }

"Phase II: Fecth the entire PRP from the RB and store in the RPB"
    for(i = 0; i < n; i++){                "for each column"
        fRB(i, YdirectionBeam);
        rBS(-i);
        sRPB(i);
    }

"Generate a scan-line by performing ray projection in the RPB"
    for(i = 0; i < n; i++){                "for each ray"
        fRPB(i);
        pVMWB(i, j);                       "Project & store as pixel (i, j)"
    }
}
```

Algorithm for Projecting a PRP

FIG. 19

```
ProjectParallel(θ, φ)
    float θ, φ;
{
    long γ, Λ, Δζ, Δγ;
    InitIBforParallel(θ);
    Δζ = Scale Value;
    Δγ = -tan(φ) Scale Value;
    Λ = √(Δγ² + Δζ²) + 1/2;
    for(j = 0; j < n; j++){                    "for each PRP"
        γ = (j - n/2)Λ - Δγn/2;

ActivateRealBresenham(γ, Δζ, Δγ, IndexVector);
        ProjectPRP(IndexVector, j);
    }
}
```

Performing the Parallel Projection

FIG. 20

```
InitIBforParallel(θ)
    float θ
{
    long Δζ, Δl, λ, l;
    Δζ = ScaleValue;
    Δl = -tan(θ) ScaleValue;
    λ = √(Δl² + Δζ²) + 1/2;                    "gap between rays on CFB wall"
    for(i = 0; i < n; i++){                    "for each ray"
        l = (i - n/2)λ + nΔl/2;                "ray offset from center on CFB wall"

ActivateRealBresenham(l, Δζ, Δl, IndexVector);
        wIB(i, IndexVector);
    }
}
```

Initiallizing the IB for Parallel Projections

FIG. 21

```
define β    30.0    "Y spread angle"
ProjectPerspective(θ, φ, r)
    float θ, φ, r;
{
    float φ, φmin, φmax, Δφ, Hγ, d;
    long Δγ, γ, Δζ;
    Δζ = ScaleValue;
```
$d = r \cos(\theta) \cos(\phi) - \frac{n}{2};$  "distance to CFB wall"

$H_\gamma = r \cos(\theta) \sin(\phi);$  "height of $\gamma$"

```
    InitIBforPerspective(θ);
```
$\phi_{min} = \phi - \beta;$
$\phi_{max} = \phi + \beta;$
$\Delta\phi = \frac{2\beta}{n};$

```
    for(φ = φmin, j = 0; φ < φmax && j < n; φ+=Δφ, j++){
        Δγ = Δζ tan(φ);
        γ = -Hγ + d sin(φ) Δζ;
        ActivateRealBresenham(γ, Δζ, Δγ, IndexVector);
        ProjectPRP(IndexVector, j);
    }
}
```

Performing the Perpective Projection

FIG. 22

```
define α    30.0    "X spread angle"
InitIBforPerspective(θ)
    float θ;
{
    float θ, θ_min, θ_max, Δθ, H_ι, d;
    long Δι, ι, Δζ;
    Δζ = ScaleValue;
    d = r cos(θ) cos(Φ) − n/2;              "distance to CFB wall"
    H_ι = r cos(θ) sin(Φ);                  "height of ι"

θ_min = θ − α;
    θ_max = θ + α;
    Δθ = 2α/n;

for(θ = θ_min, i = 0; θ < θ_max && i < n; θ+= Δθ, i++){
        Δι = Δζ tan(θ);
        ι = −H_ι + d sin(θ) Δζ;
        ActivateRealBresenham(ι, Δζ, Δι, IndexVector);
        wIB(i, IndexVector, j);
    }
}
```

Initializing the IB for Perpective Projection

FIG. 23

METHOD AND APPARATUS FOR GENERATING ARBITRARY PROJECTIONS OF THREE-DIMENSIONAL VOXEL-BASED DATA

FIELD OF THE INVENTION

The present invention relates generally to methods of and apparatus for viewing three-dimensional voxel-based data from arbitrary viewing directions. More particularly, the present invention relates to methods of and apparatus for generating arbitrary projections of three-dimensional voxel-based data of voxel-based imagery, stored in a three-dimensional frame buffer memory.

SETTING FOR THE INVENTION

The need to model objects and processes in two-dimensional and three-dimensional (hereinafter 2-D and 3-D, respectively) space is manifest, and the advantages of doing so using computer graphic systems is equally as clear.

Presently, a variety of computer graphic systems are known, and for the greater part, have been characterized in terms of the data they manipulate. For example, there are systems that manipulate data represented on the continuous object (geometric) space $R^3$, there are those that operate on the discrete pixel-image plane $Z^2$, and there are those that work on the discrete voxel-image space $Z^3$.

Much energy and effort have been expended on systems using the former two approaches. An example of a system based on such techniques is a typical 2-D computer graphics raster-display information is stored system. Therein, 2-D graphical information is stored in a "graphic display list" as a structured collection of 2-D geometric primatives, representing a model of the scene or object to be modelled. A graphics/geometry processor creates the desired image on the basis of the display list. The display-list pictures are transformed, shaded, and colored, they are mapped onto the display screen coordinate system, and scan-converted into an unstructured matrix of pixels, and stored within a 2-D frame buffer. A video processor then refreshes the display screen from the 2-D frame buffer. Changes in the scene require that the graphics processor repeats the whole computationally-intensive pixel-generation pipeline process, again and again. This, in turn, causes both computational and buffer contention problems which slow down the working rate of the graphics system. This phenomenon is crucial especially in real-time systems such as animation and simulation.

As a result of recent developments and research, custom hardware and geometry, video or bitblt engines are now commercially available to improve or otherwise speed-up the above-described computationally-intensive pipeline process. In conjunction with these geometry engines, or as an alternative, parallel processors have been utilized, exploiting the parallel nature of images and picture handling.

Thus, as a result of such advances in computational science and technology, it has recently become quite conventional to use three-dimensional computer graphic systems having surface and solid modelling capabilities. As with other types of graphics systems, such types of systems can be characterized by the fact that the 3-D object or scene is represented by a geometric model in 3-D continuous geometric space, $R^3$. Such 3-D geometric models are typically constructed from continuous 3-D geometric representations, including for example, 3-D straight line segments, planar polygons, polyhedra, cubic polynomial curves, surfaces, and volumes, circles, and quadratic objects such as spheres, cones, and cylinders. These 3-D geometrical representations are used to model various parts of an object, and are expressed in the form of mathematical functions evaluated over particular values of coordinates in continuous $R^3$ space. Typically, the 3-D geometrical representations of the 3-D geometric model are stored in the format of a graphical display list.

Once modelled using continuous 3-D geometrical representations, the object can be graphically displayed along a particular view direction by projecting and scan-converting the graphical display list.

However, such 3-D geometrical-based graphic systems are not without shortcomings and drawbacks. For example, when viewing the 3-D geometrical model of the 3-D object, only the surfaces visible to an observer along a particular viewing direction should be displayed. However, to ensure this, the hidden surfaces must be detected using surface detection algorithms, and removed by a computationally intensive process referred to as "hidden surface removal". Also, for every small modification, such as for example, a change in viewing direction, the graphical display list must be manipulated, projected and scan-converted, which is both time consuming and computationally intensive, further limiting the technique.

Another major drawback of 3-D geometrical-based graphics systems is that projection of a 2-D view of the 3-D geometrical model, and rendering and manipulation thereof, are dependent on scene complexity.

In addition, in some applications, like in medical imaging, biology, geology and 3-D image processing, the data is already in a voxel-based form and no geometric information is available.

As an alternative to 3-D geometrical-based systems, several 3-D voxel-image space systems have been developed. In general, these voxel-image space, or voxel-based, systems are based on the concept that a 3-D inherently continuous object or scene is discretized, sampled, and stored in a large 3-D Cubic Frame Buffer (CFB) memory comprising unit cubic cells called volume elements, or "voxels". Three-dimensional objects are digitized and a regularly spaced 3-D matrix array of values is obtained and stored in the Cubic Frame Buffer. The 3-D array of voxels in the Cubic Frame Buffer is loaded with experimental data obtained by a 3-D scanner such as a CAT or MRI medical scanner, or from a voxel data base. Alternatively, the digitization is performed by scan-converting a 3-D geometrical model. Both experimental and synthetic samplings yield a cellular tessellation of the original volumes, and the resulting cellular cubic memory provides a real yet discrete model of the 3-D scene or object.

Consequently, the voxel representation, which is fundamental to all 3-D voxel-based systems, is very effective for the traditional applications employing empirical 3-D voxel imagery, such as medicine (e.g. computed tomography and ultrasounding), geology, biology, and 3-D image processing (e.g. time varying 2-D images).

The advantages of using voxel representation of objects and scenes are numerous, even if used solely for synthetic graphics, i.e. 3-D scan-conversion generated voxel objects. The projection of voxel-based images along a view direction displays only the visible surfaces and implicitly ignores the hidden surfaces of 3-D voxel-images. Also, for every small modification, there is no need of repeatedly scan-converting and manipulating "graphical display lists" as required in 3-D geometrical-based graphics systems.

Rather, a change can be made directly to the Cubic Frame Buffer images, i.e. objects can be directly edited by deleting, masking out, or adding voxels with minimal computational effort. Also, when using a voxel-based approach, projection, rendering and manipulation are independent of the scene complexity, and it is normally unnecessary to employ conventional display lists, repeated scan-conversions, and the computationally intensive hidden surface removal or surface detection algorithms.

To date, there have been several proposals for 3-D voxel-based graphics systems, all of which have one thing in common, namely, the utilization of high performance multi-processing architectures in order to process the huge amounts of voxel-represented data in the cellular cubic memory. Examples of such prior art systems, and their shortcomings and drawbacks, will be described hereinbelow.

A 3-D voxel-based graphics system hereinafter referred to as the Voxel processor or the GODPA (General Object Display Architecture) system, is disclosed in the papers "An Architecture for the Real-Time Display and Manipulation of Three-Dimensional Objects" by S. M. Goldwasser et al. published in *Proc. Int'l. Conference on Parallel Processing* at pages 269–274, and in "A Generalized Object Display Processor Architecture" published by S. M. Goldwasser in *I.E.E.E. Computer Graphics and Applications,* Volume 4, Number 10, at pages 43–55. The GODPA system is a hierarchical hardware organization, in which a 256-cube voxel memory (8-byte per voxel) is divided into 64 symmetric equal sub-cubes. Each sub-cube is itself $64^3$ voxels, which is processed by a separate concurrent Processing Element. Each Processing Element is a pipelined arithmetic processor which outputs a double set of $128 \times 128$ image-buffer and a Z-buffer. Each image-buffer is large enough to hold the largest projected image which can be created from its associated $64^3$ sub-cube. The result is processed by 8 intermediate processors, each of which merges, based on a sequence control table, the sub-image which is generated by 8 Processing Elements. As part of the GODPA system's projection method, the sequence control table contains, for a desired object orientation, eight entries sorted in the required time-order defining the x, y and z offsets of the centers of the eight largest sub-cubes with respect to the center of the whole memory. The merged image of an intermediate processor is placed in the appropriate location within an intermediate double buffer. The intermediate buffers are merged by the output processor into a $512 \times 512$ double buffer, using the same control table. When one buffer is being computed, the other is being displayed. The post processor performs in real time, tone-scale table look up and gradient shading in order to enhance the realism of the image. The projection of the cube onto the $512 \times 512$ screen is accomplished by a recursive subdivision (down to the voxel level) of the cube, into eight symmetric sub-cubes and a determination of which sub-cubes will be shown on the screen. The x and y frame-buffer coordinates of each voxel are evaluated, and the pixels are written into the frame-buffer using the "painter's algorithm" for hidden surface elimination.

The GODPA system suffers from numerous shortcomings and drawbacks. For example, the GODPA system restricts its memory to be a 256-cube because of architectural reasons where it is neatly subdivided into a power-of-2 number of sub-cubes. The GODPA system assumes that a data base of voxel-based objects exists for loading and image viewing, and is limited to operations solely in the discrete voxel image space $Z^3$. Furthermore, the GODPA system is limited to handling gray scaled images, requires a post shader to enhance their appearance, and is limited to generating parallel projections of 3-D voxel images, i.e. is capable of generating perspective projections of 3-D voxel images. Also, the GODPA system requires that the source of voxel-image data be provided from a voxel data-base.

Another prior art voxel-based graphics system serving as part of a solid modelling system, is disclosed in the publication "The Graphics PARCUM (Processing Architecture Based on Cubic Memory) System: A 3-D Memory Based Computer Architecture for Processing and Display of Solid Models" by D. Jackel, published in *Computer Graphics Forum,* Volume 4, Number 4, 1985 at pages 21–32. The cube of the PARCUM system is divided or partitioned into $64^3$ macro-voxels, each of which is regioning containing $4^3$ voxels, 1 byte for each voxel. The address for a voxel consists of the region address composed of x, y and z 4-bit sub-addresses, and a 6-bit voxel address. All voxels with the same voxel address are assigned to a specific memory module each of which can be addressed separately with 12 address lines. In other words, every voxel in a macro-voxel is assigned to a different memory module. With this addressing scheme, a macro-voxel can be fetched in parallel, one voxel being retrieved from each module. The macro-voxel is then sorted into a 64-byte output data word, with an ascending address order.

The Jackel publication proposes two hardware implementations for the projection process. One is a surface detection technique which uses a "Ray Casting" or following method realized by the address processor which contains three vector generators based on the binary rate multiplier mechanism. The vector generators are initialized by the spatial orientation parameters of the projection plane coordinates computed by the host computer. The address sequences are generated according to a search stratgey enabling detection of the surface zones. The other projection process involves analytical computation of the projection plane parameters based on the multiplication of the x, y and z addresses using a transformation matrix involving matrix multiplication. As a method of rendering, the Jackel paper suggests the use of an elimination process involving the use of distance matrix used to generate in parallel vertical and horizontal gradient matrices, followed by cosine computations for diffuse and specular reflection, and concludes with the evaluation of the perceived intensity by the observer.

The PARCUM system suffers from numerous shortcomings and drawbacks as well. In particular, the memory of the PARCUM system is limited to a 256 cube because of architectural reasons where it is neatly subdivided into powers-of-2 subcubes. The use of the Ray Casting method for parallel and perspective viewing, involves a computationally inefficient brute force approach in which 2-D array of rays is sent into the discrete 3-D memory device, to encounter the first opaque voxel along each ray. The PARCUM system's rendering capabilities are limited to color shading and does not provide for translucency. The PARCUM system is capable of only handling black and white images, and does not provide for color shading or transparency of voxel images. Furthermore, the system is limited to operation solely in the discrete voxel image space, and requires that the source of voxel-image data be provided from a voxel data base.

In response to the shortcomings and drawbacks of the above discussed voxel-based systems, applicants have proposed an alternative computer graphic system based upon voxel representation of 3-D objects in a large 3-D memory which has been described, for example, in the following publications.

"A 3-D Cellular Frame Buffer," Arie Kaufman and R. Bakalash, in *Proc. EUROGRAPHICS '85*, Nice, France, September 1985, pp. 215–220;

"Memory Organization for a Cubic Frame Buffer," Arie Kaufman, in *Proc. EUROGRAPHICS '86*, Lisbon, Portugal, August 1986, pp. 93–100;

"Towards a 3-D Graphics Workstation," Arie Kaufman, in *Advances in Graphics Hardware I*, W. Strasser (Ed.), Springer-Verlag, 1987, pp. 17–26;

"Voxel-Based Architectures for Three-Dimensional Graphics," Arie Kaufman, in *Proc. IFIP '86*, 10th World Computer Congress, Dublin, Ireland, Sept. 1986, pp. 361–366; and "CUBE - An Architecture Based on a 3-D Voxel Map," Arie Kaufman and R. Bakalash, in *Theoretical Foundations of Computer Graphics and CAD*, R. A. Earnshaw (Ed.), Springer-Verlag, 1988, pp. 689–701.

As disclosed in the above publications and generally illustrated in FIGS. 1 and 2, the proposed 3-D computer graphic workstation is based upon the 3-D voxel-based representation of objects within a large 3-D memory referred to hereinafter as a 3-D Cubic Frame Buffer, which comprises specially organized memory modules containing a cellular array of unit cubic cells called voxels. The workstation 1 is a multi-processor system with three processors accessing the Cubic Frame Buffer 2 to input sampled or synthetic data, to manipulate, to project, and to render the 3-D voxel images.

In general, the processors include a 3-D Frame Buffer Processor 3, a 3-D Geometry Processor 4, and a 3-D Viewing Processor 5. The 3-D Frame Buffer Processor 3 acts as a channel for 3-D voxel-based images which have been "scanned" using a 3-D scanner 6 such as CAT and MRI medical scanners. The 3-D scanned voxel-based images are the primary source of Cubic Frame Buffer data. Once the voxel images are stored in the Cubic Frame Buffer 2, they can be manipulated and transformed by their 3-D Frame Buffer Processor 3, which also acts as a monitor for 3-D interaction.

The 3-D Geometry Processor 4 samples and thereafter converts or maps 3-D continuous geometrical representations of a 3-D object, into their 3-D discrete voxel representation within a Cubic Frame Buffer 2. Notably, the 3-D continuous geometrical representations comprise a set of mathematical functions which, as a whole, serve as a 3-D model of the 3-D object. Together, the sampling and conversion (i.e. mapping) process is typically referred to as a "scan-conversion" process.

Referring to FIG. 3, in particular, a general overview of the 2-D and 3-D scan-conversion processes is given in terms of (i) mapping from continuous 3-D geometric models to 2-D discrete pixel image space, and (ii) mapping from continuous 3-D geometric models to 3-D discrete voxel-image space, respectively. In the above-described 3-D voxel-based systems, the 2-D scan-conversion process illustrated in FIG. 3 is not carried out as such prior art processes are strictly limited to 2-D image data based generation and 2-D pixel image modelling, whereas in contrast, the 3-D scan-conversion process provides robust 3-D image data base generation and 3-D voxel image modelling.

The 3-D Viewing Processor 5 examines the voxels in the Cubic Frame Buffer 2 in the specified view direction which can be one of a variety of directions. By taking into consideration depth, translucency and color values, the 3-D Viewing Processor 5 generates a 2-D shaded projection (i.e. video pixel image) of the cubic frame voxel-based image, inputs the same into a conventional 2-D Frame Buffer 7, which in turn is scanned by a conventional video processor 8, thereby updating a video screen 9 with the 2-D shaded pixel image. The Viewing Processor 5 also performs the viewing transformations, hidden surface removal, rendering, and allows for different viewing angles, or directions.

Producing in real-time 2-D projections of images stored in the Cubic Frame Buffer 2, depends on the specified view direction, the view position of the observer, and the viewing parameters, and involves handling a huge amount of data. In fact, in order to generate an orthographic projection of a moderate resolution (i.e. $512 \times 512 \times 8$) the data flux through the Viewing Processor 5 is enormous. To appreciate the task of the Viewing Processor, an example is in order.

Using the Cubic Frame Buffer 2 as the 3-D storage device for voxel-based representation of 3-D objects and scenes, it is expected that there are numerous ways in which to generate a 2-D orthographic projection. For example, one approach would be to scan inwards along a beam of voxels parallel to a principal axis, examining each voxel at a time, skipping over the transparent voxels until an opaque voxel is encountered, and then assigning the value of the opaque voxel to a pixel of the 2-D Frame Buffer 7, which is periodically scanned by the video processor 8. Using this technique, a full 2-D projection frame would require, on the average, the processing of half of the voxels in the Cubic Frame Buffer. Consequently, the throughput required of the Viewing Processor 5 would be enormous. For a moderate Cubic Frame Buffer resolution of $512 \times 512 \times 512 \times 8$, the required rate of data flow is in the order of 0.50 Giga bit/second when the Viewing Processor 5 generates a new frame in the 2-D Frame Buffer 7, only once every second. Since this rate is far beyond the capabilities of existing or forthcoming single processors, parallel processing is imperative.

A solution to the above-described "voxel-image projection problem", was proposed in applicants' above-described publications. Specifically, applicants proposed a method whereby the Viewing Processor 5 would employ a sequence of (Voxel Multiple-Write) processing units which would simultaneously process a full beam of voxels along a specified viewing direction, (each voxel in a separate processing unit), and select the first opaque voxel closest to the assumed observer viewing along that viewing direction, in a time which is proportional to the log of the length of the beam. A voxel value defined as a transparent color would be used to disable all the processing units holding transparent voxels, all the units holding opaque units would be allowed to access a common bus, each attempting to place its opaque voxel value, one byte at a time, onto the bus. The opaque value closest to the observer wins and its voxel value is transferred to the 2-D Frame Buffer 7.

Thus, by retrieving beams of voxels after beams of voxels from the Cubic Frame Buffer 2 using voxel multiple write bus, a 2-D projection of the Cubic Frame Buffer image could be generated onto a 2-D graphic display.

Consequently, a full projection of $n^3$ voxels could be generated in $O(n^2 \log n)$ time instead of the conventional $O(n^3)$ time. Thus, by handling beams of voxels instead of single voxels, the speed of the Viewing Processor 5 could be greatly increased, and the required throughput thereof be about 2 mega bit/second instead of about 0.5 giga bit/second.

However, the proposed projection method, while in theory quite simple, nevertheless posed several other problems which had to be solved in order to successfully carry out the projection method.

In particular, the time required to sequentially retrieve a single beam of 512 voxels, for example, is 52 microseconds, and the proposed projection method requires retrieval of 512 full beams of 512 voxels from a $512^3$ voxel Cubic Frame Buffer, which takes about 14 seconds, assuming a 100 nanosecond memory cycle time. Thus, it is clear that the bottleneck of applicants' proposed voxel-based system, would be the time required to retrieve a beam of voxels from the Cubic Frame Buffer 2.

To alleviate this memory accessing (i.e. storage/retrieval) problem, applicant proposed in the above-referenced publications, a specific 3-D "symmetrically-skewed" memory storage organization for the Cubic Frame Buffer 2, which could provide conflict-free access to the Cubic Frame Buffer 2 along storage/retrieval directions parallel to the x, y and z principal axes thereof.

As illustrated in FIG. 4A, the skewed memory storage organization involved sectioning the 3-D voxel space of the Cubic Frame Buffer into diagonal parallel sub-spaces having a 45° angle with respect to the main principal axes planes. According to this proposed memory organization scheme, a voxel having space coordinates x, y and z is mapped into the k-th memory module of the Cubic Frame Buffer according to the skewing function, $k=(x+y+z) \mod n$, where n is the length of one side of the $n \times n \times n$ cubic memory buffer, and where each internal memory cell indice (i, j) within each k-th memory module is given by i=x, and j=y. Since two coordinates are always constant along any beam of voxels in the Cubic Frame Buffer regardless of the viewing direction, the third coordinate guarantees that only one voxel from the beam resides in any one of the memory modules.

According to this proposal, the physical memory of the Cubic Frame Buffer is divided into n memory modules, as illustrated in FIGS. 4B through 4E. To ensure that no two voxels of a beam reside in the same module, and therefore, that all the voxels of a beam can be retrieved simultaneously (i.e. in parallel) in one memory cycle, each memory module has its own independent address, k. However, thus, using this proposed memory organization, a full beam of n voxels stored away "scrambled" in n different memory modules, could be, in theory, simultaneously accessed for all three principal viewing directions, i.e. along the ±x, ±y, ±z principal axes.

However, the voxel-based system proposed in applicants' prior art publications, was not without limitations and shortcomings. In particular, the system proposed in the above references is limited to parallel projection of 3-D voxel images, along one or more of the six principal view directions: +x, −x, +y, −y, +z, −z orthographic views parallel to the principal axes. Thus, viewing of the 3-D voxel image in the Cubic Frame Buffer from more than the six principal viewing directions, requires that the 3-D voxel image in the Cubic Frame Buffer is first transformed (i.e. rotated) using the 3-D Frame Buffer Processor (an operation which distorts the 3-D voxel image every time a rotation is executed for a different viewing), and thereafter by projecting the transformed version of the 3-D voxel image along one of the principal orthographic retrieval directions. In this method of viewing, viewing the transformed version of the 3-D voxel-based image is, by principle, not along an arbitrary viewing direction which may differ from the retrieval direction. In addition, the actual performance of a rotation, though it is done incrementally, is only near real-time, estimated at about 0.5 second for a $512^3$ voxel based image. Thus, since it is only through such a process that arbitrary parallel projections are achievable, true real-time applications involving simulation and user-interaction, are not technically feasible.

In response to the shortcomings and drawbacks of the above-described 3-D voxel-based graphics systems, applicants developed a method and apparatus (in the form of a 3-D voxel-based graphics system) which provides for the non-distorted parallel viewing (i.e. projection) of 3-D voxel-based images, in discrete 3-D voxel space $Z^3$, along 26 viewing directions, as illustrated in FIG. 5B, in a projection time identical to that required for orthographic projections. This method and apparatus is disclosed in pending U.S. patent application Ser. No. 269,567, by Kaufman et al., entitled "Method and Apparatus for Storing, Accessing, and Processing Voxel-Based Data", filed on Nov. 10, 1988, which is incorporated herein by reference as if fully set forth herein. Notably, while the method of and apparatus for U.S. application Ser. No. 269,567 have many, many advantages over the prior art, they are not completely free of limitations. For example, while the method and apparatus thereof allow rays (i.e. beams of voxels) to be retrieved in a conflict-free manner along large, but finite (e.g. 26) storage/retrieval directions to provide for non-orthographic parallel projection of 3-D voxel images along the finite number of viewing directions, only parallel projection of 3-D voxel-based images can be achieved with such method and apparatus, although conceivably, through multiple but limited number of fetches per ray, parallel projection can be achieved.

In view, therefore, of prior art 3-D voxel-based graphic systems, there is a great need for 3-D voxel-based graphic systems and methods which are capable of generating arbitrary parallel and perspective projections of 3-D voxel-based images represented in 3-D discrete voxel space $Z^3$, and thereby allow for arbitrary parallel and perspective viewing of 3-D voxel-images, without the shortcomings and drawbacks of prior art methods and apparatus.

In addition to 3-D voxel-based graphic systems which are fast, computationally efficient, and organized to simplify hardware and software implementation, there is also a great need for 3-D voxel-based graphic systems and methods capable of generating parallel and perspective projections of 3-D voxel images from arbitrary viewing directions, and in a manner which is independent of the retrieval parameters utilized in retrieving the voxels of the 3-D voxel-based image during the projection (i.e. viewing) process.

In particular, there is a great need for methods and apparatus for generating parallel and perspective projections from arbitrary viewing directions, in a manner which is independent of and thus need not correspond to, the storage/retrieval directions available in the 3-D voxel space of a particular voxel-based system.

There is also a great need for such 3-D voxel-based graphic systems and methods, which do not result in distorting or otherwise degrading the quality of information of such 3-D voxel images by requiring transformation (i.e. rotation) of the stored 3-D voxel image, prior to projection.

Accordingly, it is a principal object of the present invention to provide a method of generating arbitrary parallel and perspective projections of a 3-D voxel-based image represented in discrete 3-D voxel space.

It is another object of the present invention to provide a method and apparatus for generating arbitrary parallel and perspective projections of a 3-D voxel-based image, in a manner independent of the retrieval parameters used to retrieve the voxels of the 3-D voxel-based image during the projection process.

It is another object of the present invention to provide a method of viewing a 3-D voxel-based image represented in discrete 3-D voxel space, in which the voxels of the 3-D voxel-based image are retrievable along at least one retrieval direction, and where the 3-D voxel-based image can be viewed along a direction which may, and typically will differ from the retrieval direction.

It is another object of the present invention to provide apparatus for generating arbitrary parallel and perspective projections of 3-D voxel-based images represented in 3-D voxel space, in a computationally efficient manner.

A further object of the present invention is to provide a 3-D voxel-based graphics system having the capability of generating an infinite number of arbitrary parallel and perspective type projections of 3-D voxel-based images represented in discrete 3-D voxel space.

A further object of the present invention is to provide method and apparatus for demapping (i.e. deskewing) voxel data in skewed memory storage space format, into unskewed voxel data in 2-D or 3-D voxel space format Another object of the present invention is to provide a method and apparatus for use in simulating the physics of wave energy propagation of, for example, electromagnetic energy generated by point or plane radiation (e.g. light) sources, and ultrasonic energy, as well.

Yet a further object of the present invention is to provide method and apparatus for restructuring 3-D space.

An even further object of the present invention is to provide general methods and apparatus for storing, accessing, and/or processing general-purpose 3-D data in a computer system.

Other and further objects of the present invention will be explained hereinafter, and will be more particularly delineated in the appended claims, and other objects of the present invention will be apparent to one with ordinary skill in the art to which the present invention pertains.

SUMMARY OF THE INVENTION

According to one of the broader aspects of the present invention, a method is provided for parallel and perspective viewing of a 3-D voxel-based image along an arbitrary viewing direction specifiable by viewing parameters. In general, the method for viewing a 3-D voxel-based image comprises retrieving the voxels of the 3-D voxel-based image represented in discrete 3-D voxel space, using retrieval parameters. Thereafter, along an arbitrary viewing direction, specifiable by viewing parameters, the 3-D voxel-based image is viewed (i.e. projected onto pixel-image space) independent of the retrieval parameters.

In one embodiment of the present invention, the 3-D voxel-based image is viewed by first forming on the basis of the retrieved voxels, a plurality of voxel-based viewing rays along the arbitrary viewing direction, and then viewing the 3-D voxel-based image on the basis of the plurality of voxel-based viewing rays. Preferably, the formation of the voxel-based viewing rays is carried out by first forming a plurality of Projection Ray Planes on the basis of the retrieved voxels, and then forming the plurality of voxel-based viewing rays on the basis of the plurality of Projection Ray Planes thus formed. Thereafter, for each viewing ray in the Projection Ray Plane, the viewing ray is analyzed so as to determine the first non-transparent voxel along the viewing ray which is closest to an observer viewing the 3-D voxel-based image. The result of this analysis is a set of pixels which forms the arbitrary projection in pixel-image space.

In the preferred embodiment, the manner in which the plurality of viewing rays is retrieved or accessed from each voxel-based Projection Ray Plane, is by first computing address values for retrieving the viewing rays from each Projection Ray Plane, and then retrieving the voxels of the voxel-based Projection Ray Plane using the computed address values, to form the plurality of viewing rays. Notably, the address value computation process is carried out on the basis of the viewing parameters used in specifying the viewing direction.

In the preferred embodiment, the 3-D voxel-based image is stored in 3-D discrete voxel space according to a first skewed memory storage scheme, which provides for simultaneous accessing of the plurality of voxels (i.e. retrieval rays) along at least one retrieval direction. The first skewed memory storage scheme involves mapping the voxels of the 3-D voxel-based image in discrete 3-D voxel space, into a first skewed memory storage space. In the preferred embodiment, the discrete 3-D voxel space is realized as a Cubic Frame Buffer having six conflict-free storage/retrieval directions.

Another aspect of the present invention is to provide a method and apparatus for generating arbitrary parallel and perspective projections of a 3-D based voxel image, which are viewed along an arbitrary viewing direction and in a manner independent of retrieval parameters utilized in accessing the voxels of the 3-D voxel-based image. In particular, the method comprises specifying a plurality of voxel-based Projection Ray Planes which extend through the discrete 3-D voxel space. Then for each 3-D voxel-based Projection Ray Plane, a plurality of voxels is retrieved along at least one retrieval direction in the 3-D voxel space; a plurality of voxel-based projection rays is formed on the basis of the plurality of retrieved voxels; and on the basis of the plurality of voxel-based projection rays, an arbitrary projection of the voxel-based Projection Ray Plane is generated. On the basis of the arbitrary projections of the voxel-based Projection Ray Planes, an arbitrary projection of the 3-D voxel-based image is formed. Notably, the resulting arbitrary projection of the 3-D voxel-based image, is represented in pixel-image space.

In the preferred embodiment, the 3-D voxel-based image is stored in a 3-D memory storage device in accordance with a 3-D skewed memory storage scheme, which provides for the simultaneous accessing of a plurality of voxels along six conflict-free retrieval directions parallel to the principal axes of a Cubic Frame Buffer. Since this 3-D skewed memory storage scheme involves mapping the voxels of the 3-D voxel-based image into a 3-D skewed memory storage space $M^3$, retrieving the plurality of voxels along at least one retrieval direction (for each Projection Ray Plane), involves carrying out several steps which serve to partially deskew the retrieved voxel data. Then while forming the plurality of voxel-based projection rays on the basis of the plurality of retrieved voxels, the method hereof involves performing several other steps which serve to further deskew the retrieved voxel data so as to provide an unskewed Projection Ray Plane in an unskewed 2-D voxel space format.

In particular, during retrieval of the voxels of each Projection Ray Plane, along at least one retrieval direction, the voxels of the voxel-based retrieval rays (i) are accessed from the 3-D skewed memory storage space, (ii) are demapped along at least one of the coordinate directions using a demapping operation based upon the 3-D skewed memory storage scheme, and (iii) are then stored in a 2-D memory storage space according to a 2-D skewed memory storage scheme. This memory storage scheme provides for simultaneous access to the voxels of a plurality of voxel-based fetching rays along a plurality of fetching directions extending through the 2-D skewed memory storage space. The plurality of voxel-based projection rays is formed on the basis of the retrieved voxels, by (i) accessing the voxels of the voxel-based fetching rays from the 2-D memory storage space, (ii) demapping the voxels of the fetching rays along other coordinate directions using a demapping operation based upon the 2-D skewed memory storage scheme, and then (iii) storing each demapped fetching ray in unskewed 2-D discrete voxel space. By carrying out the above steps, a plurality of voxel-based projection rays is formed on the basis of the plurality of retrieved voxels. Then, by analyzing each voxel-based projection ray as described hereinabove, a plurality of pixels is obtained to form the arbitrary projection of the 3-D voxel-based image.

Another aspect of the present invention is apparatus for carrying out the methods of arbitrary parallel and perspective viewing in accordance with the principles of the present invention.

As a result of the present invention, it is now possible to view in a parallel or perspective manner, 3-D voxel-based images along truly arbitrary viewing directions, notwithstanding the fact that the 3-D voxel-based image is stored or otherwise represented in a 3-D memory storage device having limited memory accessing capabilities, generally specifiable in terms of retrieval parameters.

Also, as a result of the present invention, it is now possible to carry out such robust parallel and perspective viewing processes utilizing computational apparatus of reduced complexity, thus ensuring computational efficiency and real-time viewing for simulation and other purposes.

BRIEF DESCRIPTION OF THE DRAWINGS

For a full understanding of the objects of the present invention, reference is made to the following detailed description of the preferred embodiment which is to be taken in connection with the accompanying drawings, wherein:

FIG. 3 is a schematic diagram illustrating 2-D and 3-D scan-conversion processes and their relationship with discrete 2-D pixel-image space and discrete 3-D voxel-image space, respectively;

FIG. 6F is a schematic representation of a plurality of Projection Ray Planes specified within a Cubic Frame Buffer as illustrated in FIG. 6E, in which one of the viewing parameters Φ is specified for use in conjunction with the parallel viewing process illustrated therein;

FIG. 6G is a schematic representation of a single projection ray plane specified within a Cubic Frame Buffer during the parallel viewing process illustrated in FIG. 6E;

FIG. 6H is a schematic representation of a plan view of the projection ray plane illustrated in FIG. 6G, in which another viewing parameter Θ is specified for carrying out the parallel viewing process illustrated in FIG. 6E;

FIG. 8 is a block schematic diagram of apparatus for generating arbitrary projections of 3-D voxel-based images in accordance with the principles of the present invention, showing a Central Addressing Unit, a 3-D Memory Storage Device, a Mechanism for Forming Projection (i.e. Viewing) Rays, a Ray Projection Subsystem, and a 2-D Frame Buffer;

FIG. 9 is a block schematic diagram of another embodiment of apparatus for generating arbitrary projections of 3-D voxel-based images in accordance with the principles of the present invention, showing all the components of the apparatus illustrated in FIG. 8, and with the Mechanism for Forming Projection Rays comprising a Projection Ray Arrangement (PRA) Retrieval Mechanism and a Mechanism for Forming Projection Rays from a Projection Ray Arrangement;

FIG. 10 is a block diagram of another embodiment of apparatus for generating arbitrary projections of 3-D voxel-based images in accordance with the principles of the present invention, showing all of the components of the apparatus illustrated in FIG. 8, and where the 3-D Memory Storage Device comprises a Cubic Frame Buffer, and the Mechanism for Forming Projection Rays comprises a Projection Ray Plane (PRP) Retrieval Mechanism, a Projection Ray Plane Memory Buffer and a Projection Ray Addressing Mechanism;

FIG. 14 is a block schematic diagram of the k-th Projection Ray Formation Unit illustrated in FIG. 13, showing in greater detail the components comprising the preferred embodiment thereof;

FIG. 17 is a pseudo-C computer subroutine used for (i) computing the first end coordinate value (i.e. "intersection point") of the "pitchline" of each Projection Ray Plane which intersects with the front wall of the Cubic Frame Buffer 12 closest to viewpoint V, and invoking the computer subroutine in FIG. 18 to compute the rest of the coordinate values of each "pitchline", and (ii) for computing the first end coordinate value of each "yaw-line" (i.e. Projection Ray) of each formed Projection Ray Plane, and invoking computer subroutine of FIG. 18 to compute the rest of the coordinate values along each yaw-line to be stored as address values in the Projection Ray Plane Formation Addressing Buffer of the preferred embodiment hereof;

FIG. 18 is a pseudo-C computer subroutine called in the computer sub-program of FIG. 17, as described hereinabove;

FIG. 19 is a pseudo-C computer subroutine implementation of the functions and hardware actualities of the preferred embodiment of apparatus for generating arbitrary projections of 3-D voxel-based images illustrated in FIGS. 12, 13 and 14, in which an arbitrary projection is generated by forming a plurality of Projection Ray Planes, each of which is formed by retrieving a plurality of beams of voxels (i.e. retrieval rays) along conflict-free retrieval directions of the Cubic Frame Buffer of FIG. 5A, and from each Projection Ray Plane, a scan-line of pixels is generated so as to generate an arbitrary 2-D projection of a 3-D voxel-based image represented in the Cubic Frame Buffer;

FIG. 20 is a high-level pseudo-C computer program implementation of the method of generating arbitrary parallel projections of 3-D voxel-based images, using the preferred embodiment of the apparatus of the present invention illustrated in FIGS. 12 through 14;

FIG. 21 is a pseudo-C computer subroutine for carrying out, in the case of generating arbitrary parallel projections, the initialization of the Projection Ray Plane Addressing Buffer of the apparatus illustrated in FIGS. 12 through 14, and involving the use of the computer subroutines shown in FIGS. 17, 18, 19 and 21;

FIG. 22 is a pseudo-C high-level computer program implementation of the method of generating arbitrary perspective projections of 3-D voxel-based images, using the apparatus of the preferred embodiment illustrated in FIGS. 12 through 14; and FIG. 23 is a pseudo-C computer subroutine for carrying out, in the case of generating arbitrary perspective projections, initialization of the Projection Ray Plane Addressing Buffer of the apparatus illustrated in FIGS. 12 through 14, and involving the use of the subroutines shown in FIGS. 17, 18, 19 and 22.

DETAILED DESCRIPTION OF THE EMBODIMENTS HEREOF

Figure 7:
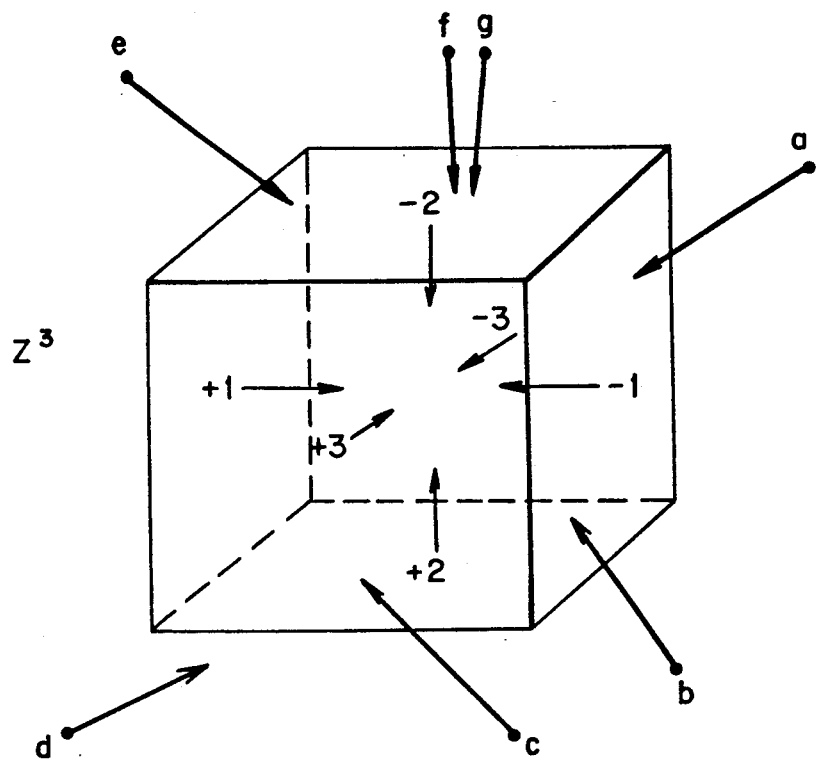
FIG. 7 is a graphical representation of a cellular matrix array model of a 3-D Cubic Frame Buffer in 3-D voxel space, having six orthographic storage/retrieval directions (i.e. retrieval parameters), where, using the method and apparatus of the present invention, parallel and perspective viewing of a 3-D voxel-based image represented therein is possible along arbitrary viewing directions and in a manner which is independent of the storage/retrieval directions (i.e. retrieval parameters)
Figure 16:
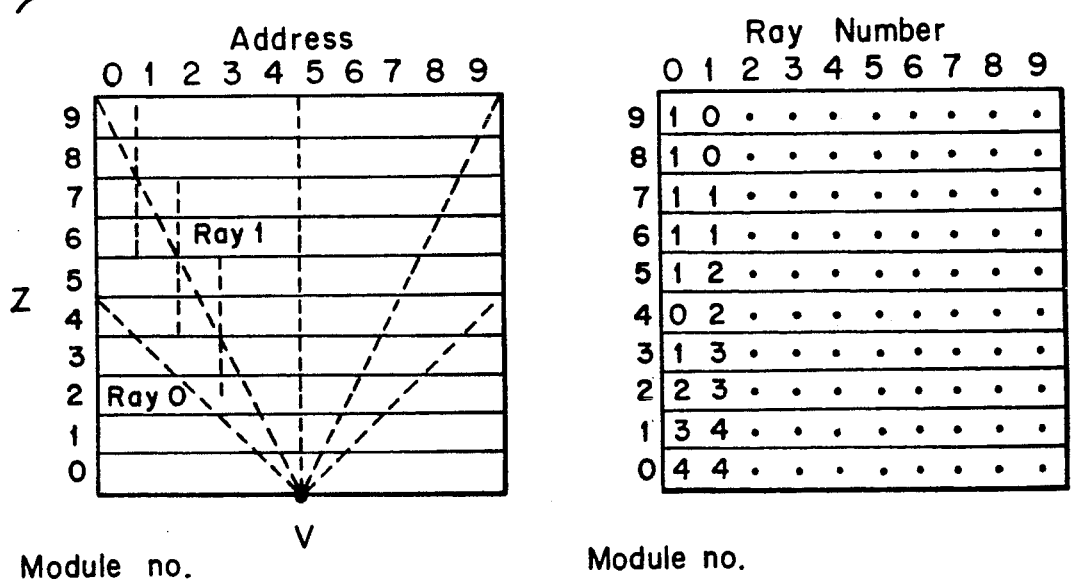
FIG. 16 is a schematic representation of a process in which a Projection Ray Plane generated by the process illustrated in FIG. 15, is provided to the Projection Ray Plane Formation Buffer, and individual projection rays comprising each Projection Ray Plane are (i) accessed therefrom using address (i.e. index) data computed on the basis of the viewing parameters illustrated in FIG. 6D and/or FIG. 6H and (ii) stored in the PRP Formation Addressing Buffer of the Projection Ray Formation Mechanism hereof, so that subsequently the individual projection (viewing) rays can be accessed from the Projection Ray Plane Formation Buffer for projection using the Ray Projection Subsystem hereof.

Referring to FIGS. 7 and 8, the method and apparatus of the present invention will now be generally described as follows.

In FIG. 7, a graphical representation of a 3-D memory storage device, e.g. a Cubic Frame Buffer, in discrete 3-D voxel space is shown, in which for purposes of illustration, six storage/retrieval directions are indicated by arrows labelled $\pm 1$, $\pm 2$, $\pm 3$, where along each of the storage/retrieval directions, conflict-free access to voxels is provided. While the present invention is generally understood to contemplate retrieval of voxels comprising 3-D voxel-based images using "retrieval parameters", in FIG. 7, these retrieval parameters (i.e. $\pm 1$, $\pm 2$, $\pm 3$ which correspond to $\pm x$, $\pm y$ and $\pm z$) are in the form of conflict-free retrieval directions, but in other embodiments may take on the form of plane numbers, ray numbers, sub-cube numbers, indices, random-access indices and so on. Notably, these "conflict-free" retrieval directions are generally provided by the 3-D voxel space $Z^3$, in which 3-D voxel-based images are represented. As used hereinafter and in the claims, the term "3-D voxel space" can represent a three-dimensional voxel storage medium such as the Cubic Frame Buffer 2 described hereinbefore, or it can represent other realizations in which 3-D images are represented in discrete form.

Also in FIG. 7, there is shown for purposes of illustration, seven arbitrary viewing directions indicated by arrows a, b, c, d, e, f and g. As will be described in greater detail hereinafter, such arbitrary viewing directions are specifiable in terms of solely spatial parameters, and independent of retrieval parameters used during the arbitrary parallel and/or perspective projection process hereof. This is to ensure that a user or designer utilizing, for example, a 3-D voxel-based graphic work station 1 either carrying out the method or embodying the apparatus of the present invention, can simply specify an arbitrary parallel or perspective projection of a 3-D voxel-based image in $Z^3$ without having to consider the parameters employed in storing and/or retrieving voxels comprising the voxel image.

It is of particular importance to understand that the method and apparatus of the present invention enables parallel and/or perspective viewing (i.e. "projection") of a 3-D voxel-based image along an arbitrary viewing direction which is independent of the parameters used in specifying the storage and/or retrieval of the 3-D voxel-based image represented in 3-D memory space. Consequently, using the three-dimensional memory storage and addressing system disclosed in U.S. patent application Ser. No. 269,567 by Kaufman et al., a 3-D voxel-based system so equipped, is capable of providing arbitrary parallel and/or perspective viewing along directions which are independent of the conflict-free storage/retrieval directions of the memory storage and accessing system disclosed therein. Other advantages of the present invention will become apparent hereinafter.

Referring now to FIG. 8, there is shown a schematic representation of apparatus 10 for carrying out the method of the present invention. The apparatus 10 comprises a Central Addressing Unit (i.e. system) 11, a 3-D Memory Storage Device 12, a Mechanism for Forming Projection Rays 13, a Ray Projection Subsystem 14, and a Frame Buffer 7. In the preferred embodiment, the 3-D memory storage device 12 is the Cubic Frame Buffer illustrated in FIGS. 4A through 4E and 5A, but could take on many other possible forms having a different memory organization and accessing capabilities provide that a 3-D matrix array storage representation is provided in one form or the other. The general structure and function of the Cubic Frame Buffer 12 has been described hereinbefore as well as in U.S. patent application Ser. No. 269,567. The Central Addressing Unit 11, receives viewing parameter specifications, e.g. $\Phi$, $\Theta$ and r, and provides address data to (i) the Cubic Frame Buffer 12, and (ii) the Mechanism for Forming Projection (i.e. Viewing Rays) 13, as will be described in greater detail when referring to the preferred embodiment hereof.

Figure 1:
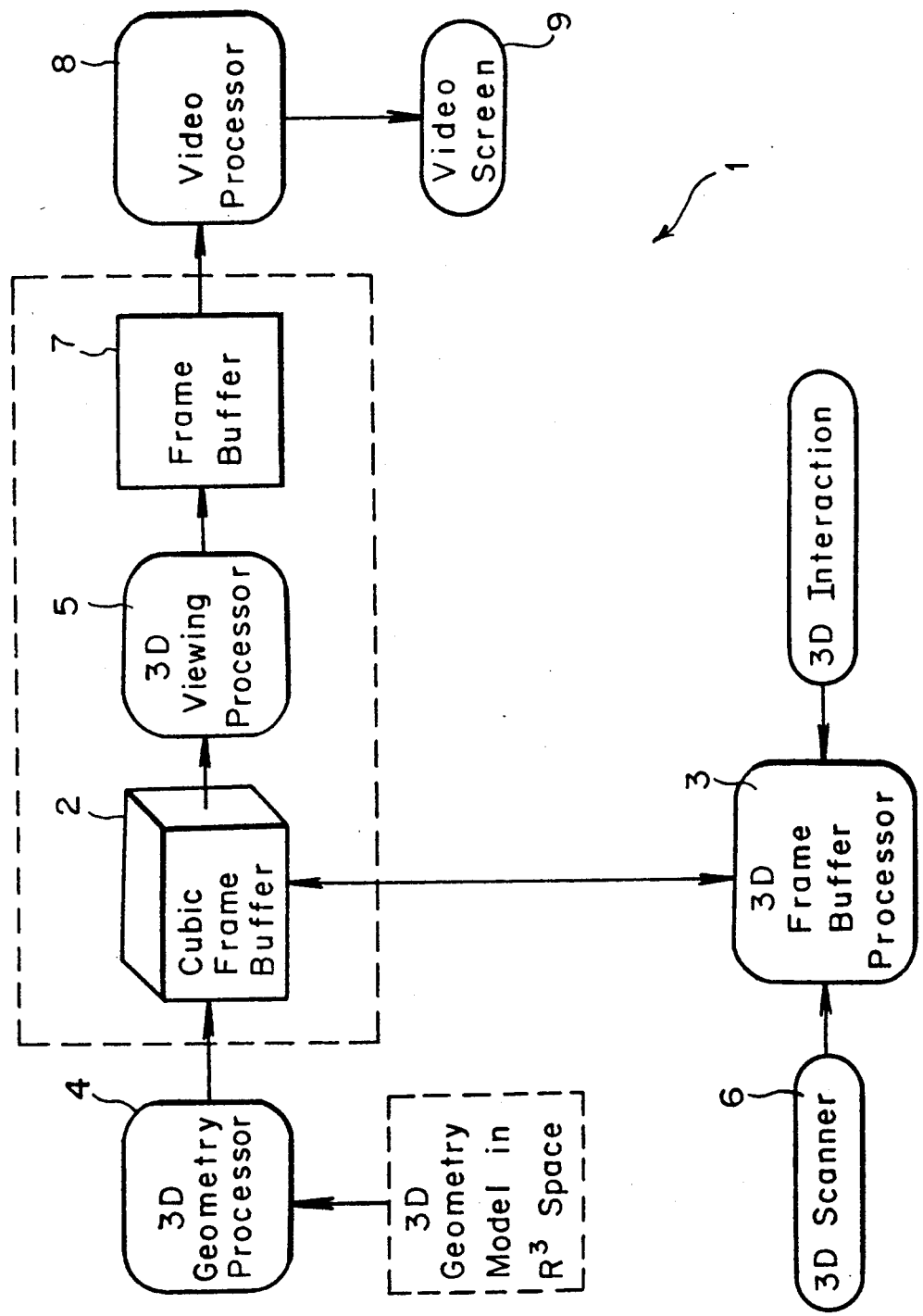
FIG. 1 is a block diagram of a 3-D voxel-based graphics workstation in which the methods and apparatus of the present invention can be carried out.
Figure 2:
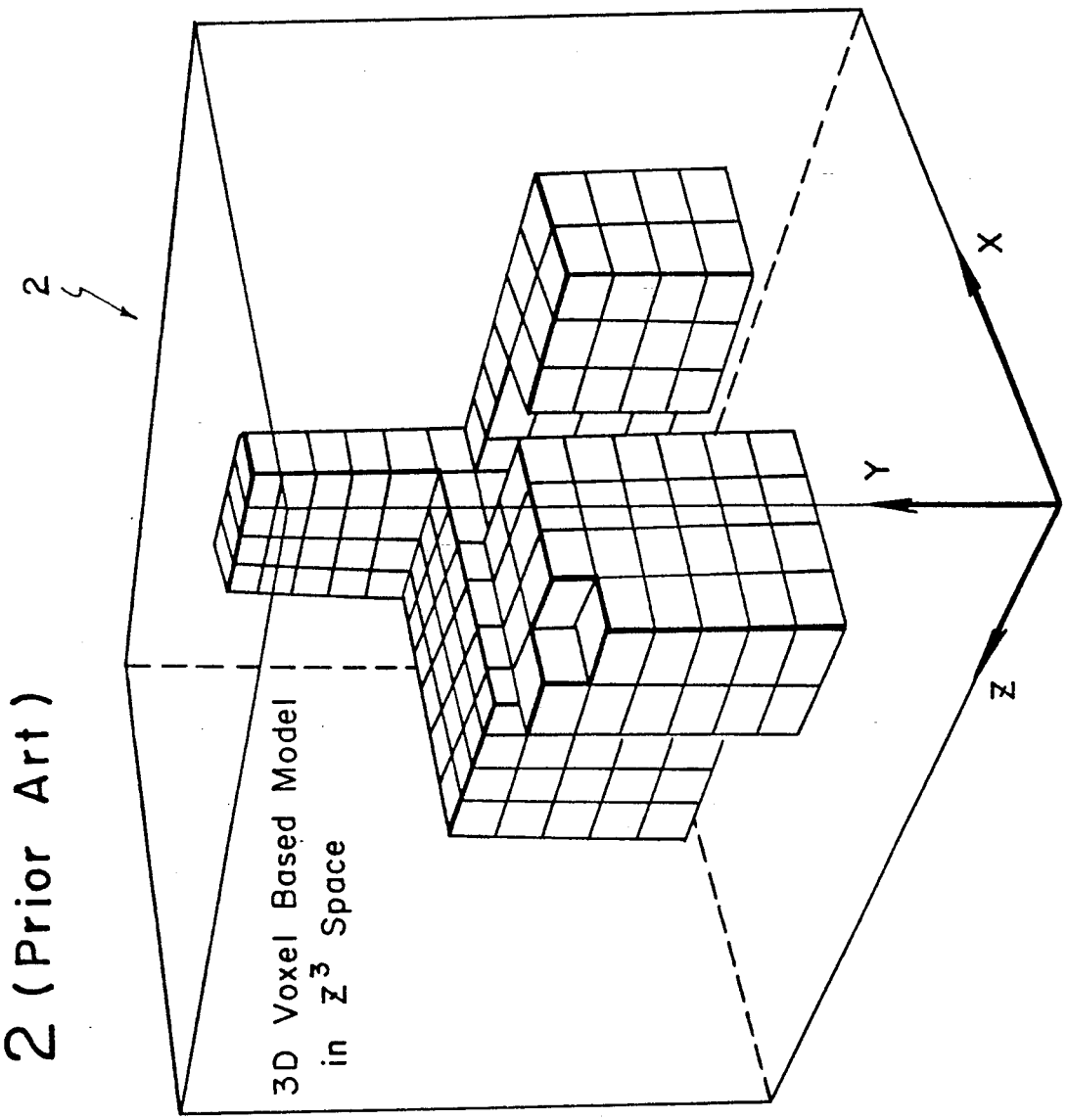
FIG. 2/is a schematic diagram of a cellular matrix array model of a 3-D Cubic Frame Buffer of the voxel-based graphics system of FIG. 1.
Figure 4A:
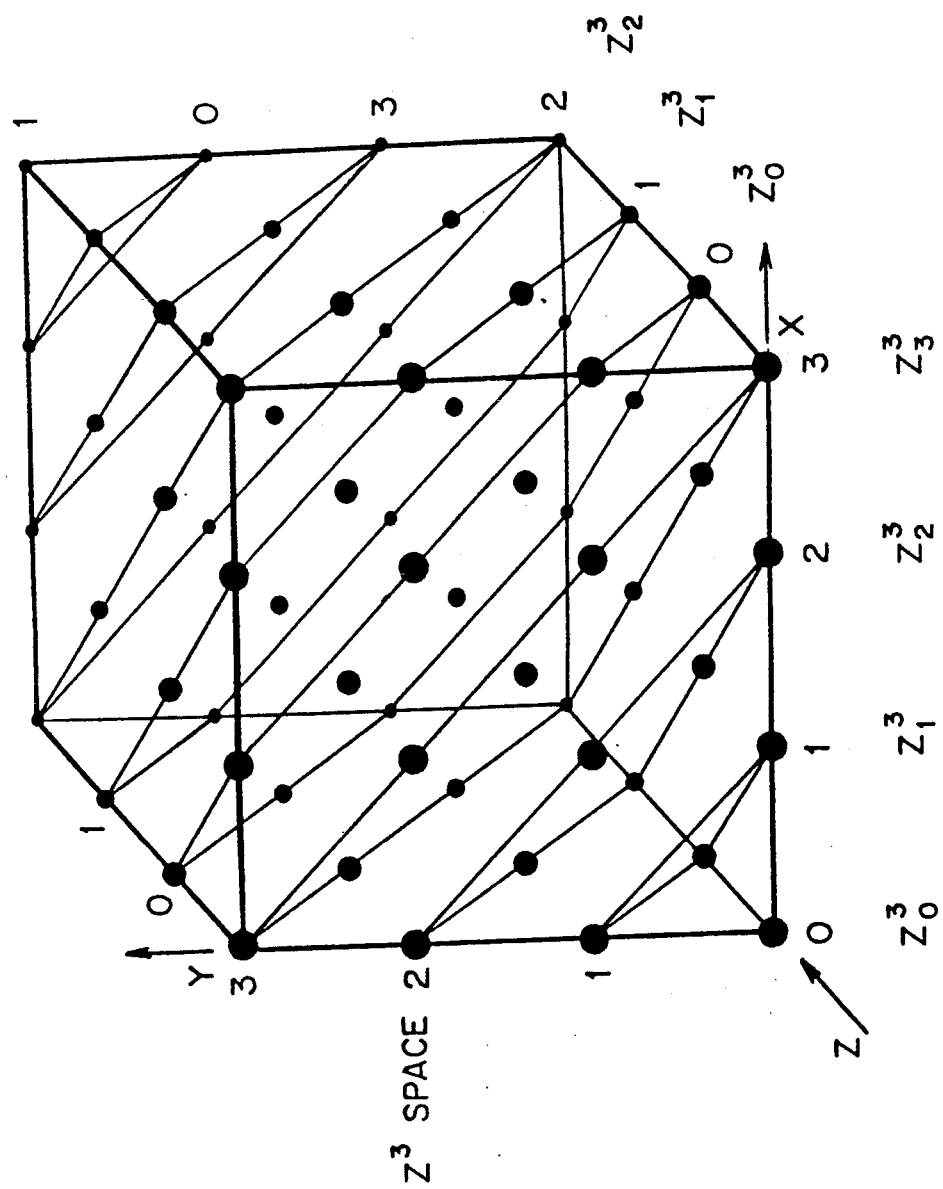
FIG. 4A is a 2-D graphical representation of the "skewed" organization of a 3-D cellular matrix array model of a 4×4×4 Cubic Frame Buffer, showing all voxels on the same diagonal section (i.e. in the same 3-D discrete voxel subspace $Z_k^3$) modulo 4 being grouped in the same memory module, and also three voxel beams in the $-x$, $+z$, and $+y$ orthographic directions laid out separately with their respective distribution of voxels among the modules, with the internal memory cell addresses (i.e. indices) shown in parentheses.
Figure 4B:
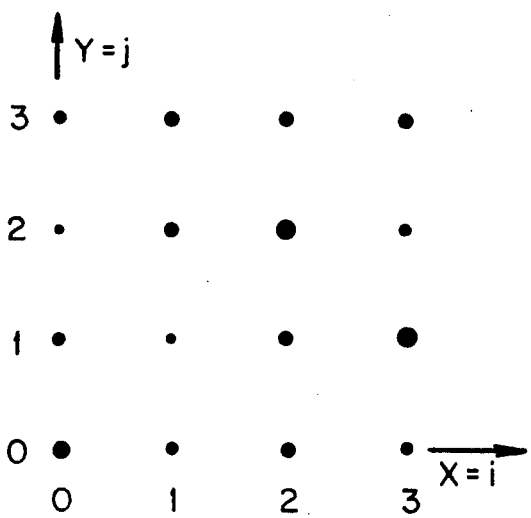
FIG. 4B is a graphical representation of the (k=0)-th memory module for the 4×4×4 Cubic Frame Buffer of FIG. 4A, showing the diagonal sections of each memory module enclosed in solid line boundaries.
Figure 4C:
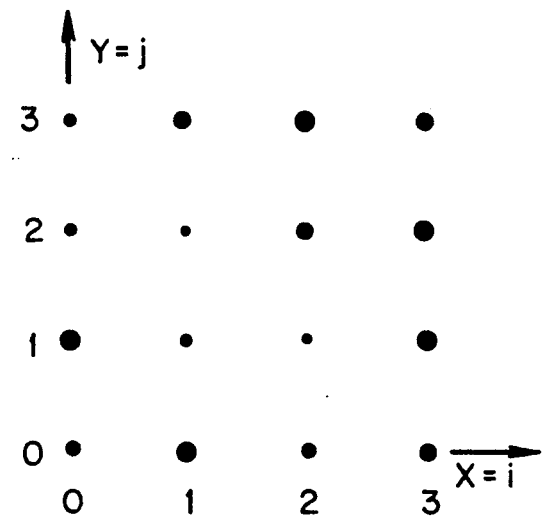
FIG. 4C is a graphical representation of the (k=1)-th memory module for the 4×4×4 Cubic Frame Buffer of FIG. 4A, showing the diagonal sections of each memory module enclosed in solid line boundaries.
Figure 4D:
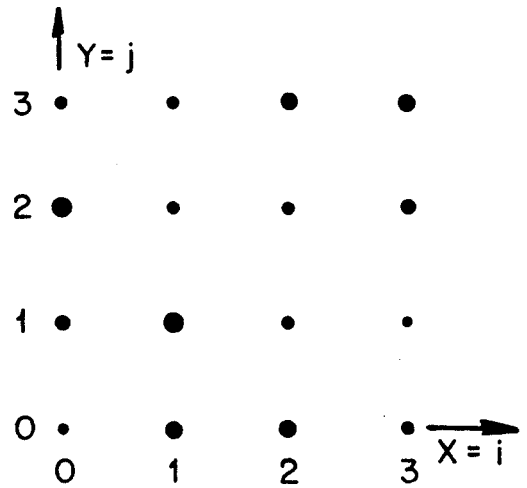
FIG. 4D is a graphical representation of the (k=2)-th memory module for the 4×4×4 Cubic Frame Buffer of FIG. 4A, showing the diagonal sections of each memory module enclosed in solid line boundaries.
Figure 4E:
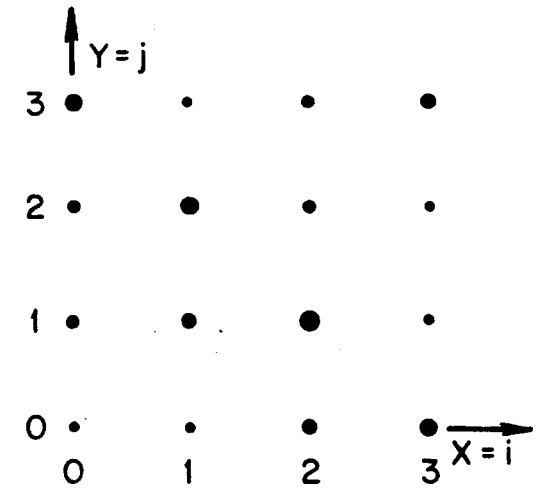
FIG. 4E is a graphical representation of the (k=3)-th memory module for the 4×4×4 Cubic Frame Buffer of FIG. 4A, showing the diagonal sections of each memory module enclosed in solid line boundaries.
Figure 5A:
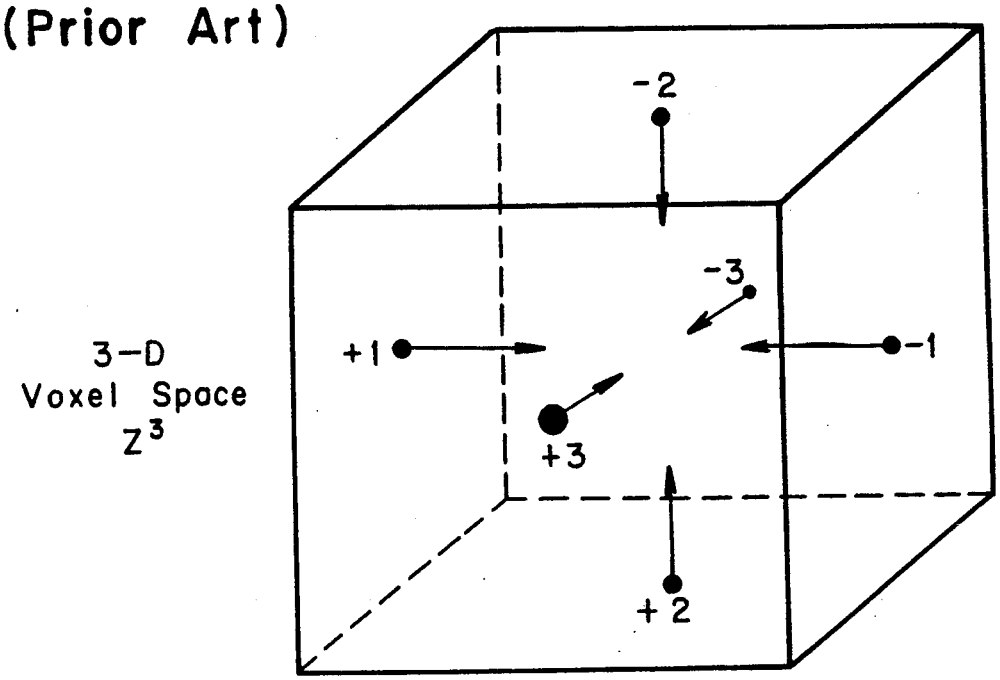
FIG. 5A is a graphical representation of a cellular matrix array model of a 3-D Cubic Frame Buffer, having six orthographic storage/retrieval (and viewing) directions.
Figure 5B:
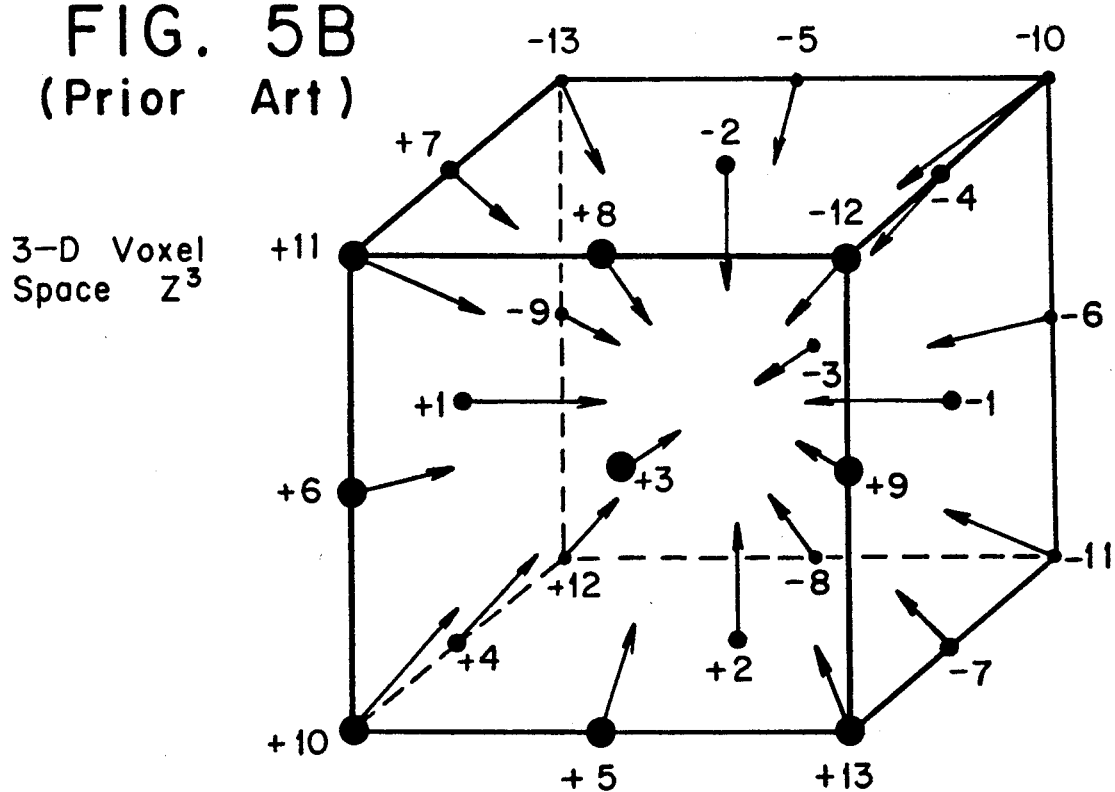
FIG. 5B is a graphical representation of a cellular matrix array model of a 3-D Cubic Frame Buffer, having twenty-six storage/retrieval (and viewing) directions.
Figures 6A, 6B:
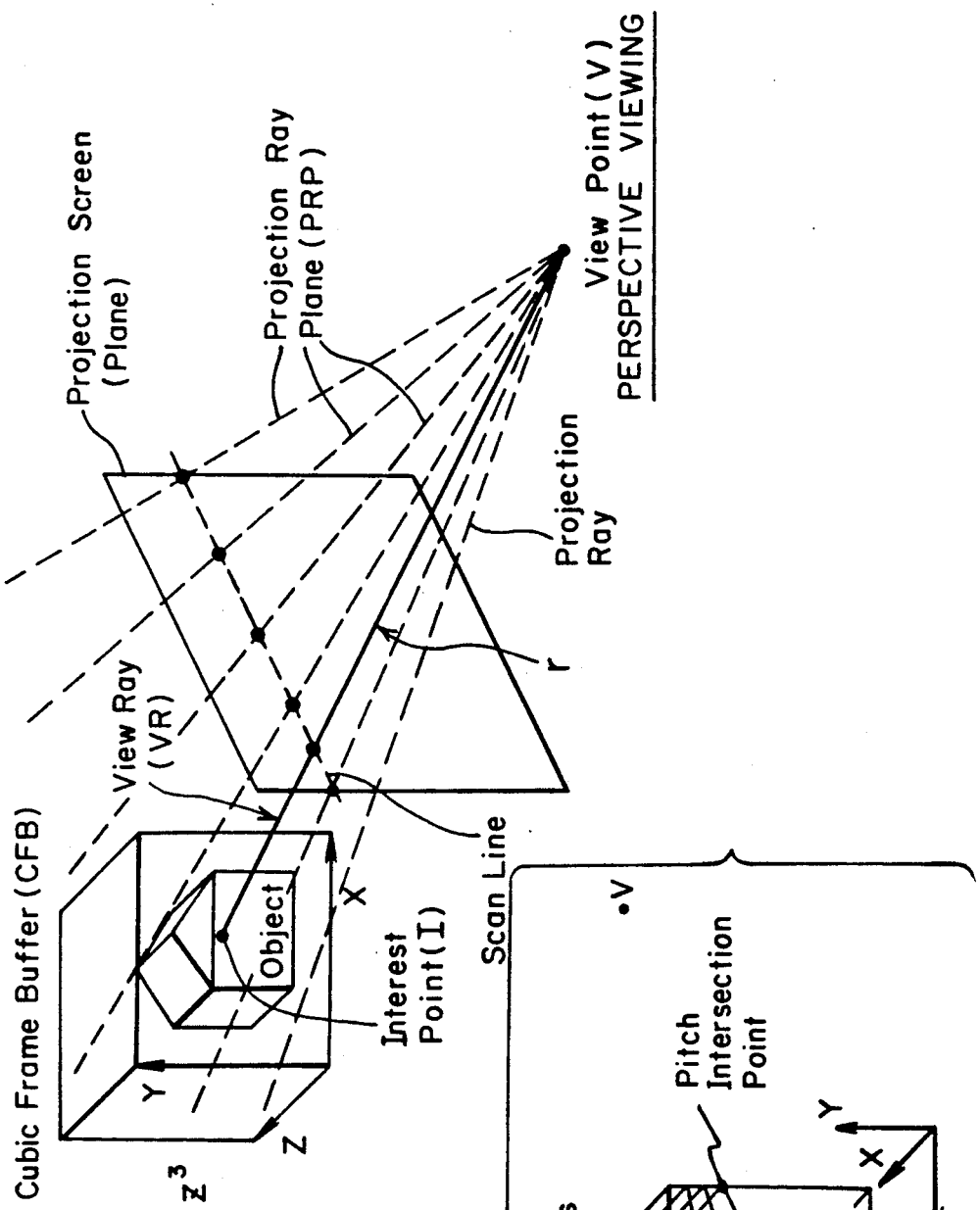
FIG. 6A is a schematic representation of a perspective viewing process carried out in accordance with the principles of the present invention, showing a Projection Ray Plane (PRP) formed by a plurality of projection rays emanating from a viewpoint in 3-D voxel space, passing through a Projection Plane (i.e. Projection Screen) and extending through a 3-D voxel-based image represented in 3-D voxel space $Z^3$.
FIG. 6B is a schematic representation of a plurality of Projection Ray Planes formed from the voxels of a Cubic Frame Buffer used in carrying out a preferred embodiment of the perspective viewing process illustrated in FIG. 6A.
Figure 6C:
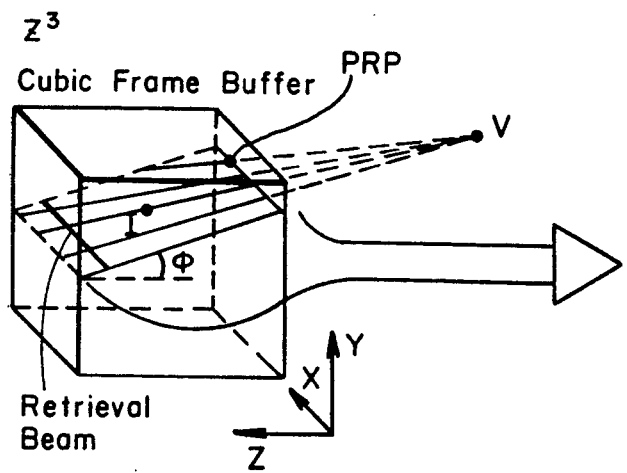
FIG. 6C is a schematic representation of a single projection ray plane specified within a Cubic Frame Buffer, in which one of the viewing parameters Φ is specified for use in conjunction with the perspective viewing process illustrated in FIG. 6A.
Figure 6D:
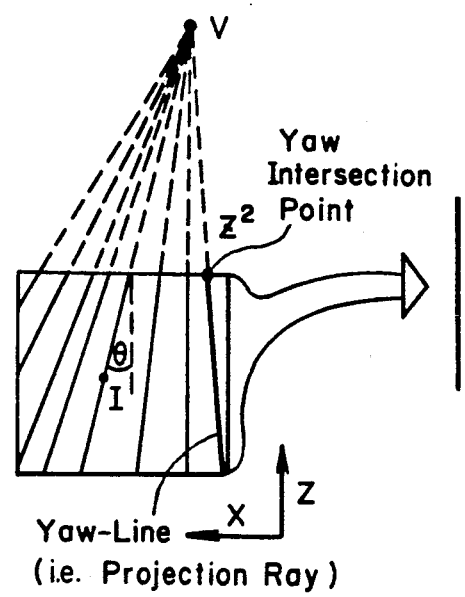
FIG. 6D is a schematic representation of a plan view of the projection ray plane illustrated in FIG. 6C, in which another viewing parameter Θ is specified for carrying out the perspective viewing process illustrated in FIG. 6A.
Figure 6E:
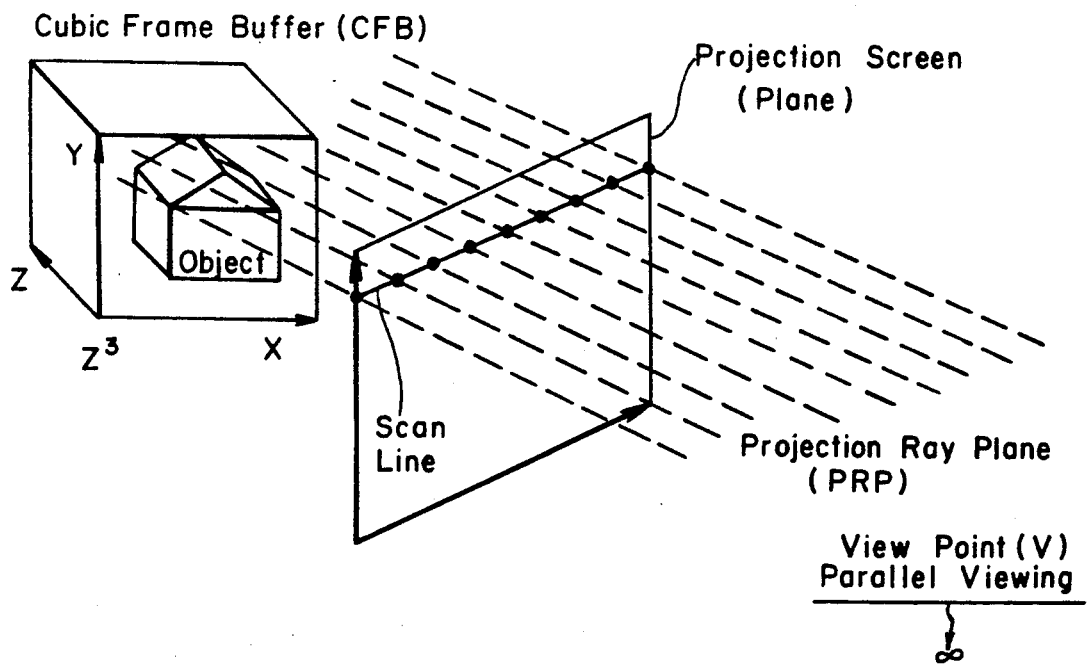
FIG. 6E is a schematic representation of a parallel viewing process carried out in accordance with the principles of the present invention, showing a Projection Ray Plane formed by a plurality of projection rays emanating from a viewpoint near infinity in 3-D voxel space, passing through a Projection Plane (i.e. Projection Screen) and extending through a 3-D voxel-based image represented in 3-D voxel space $Z^3$.

To appreciate the structure and function of a particular embodiment of the Mechanism for Forming Projection Rays 13 hereof, reference is made to FIGS. 6A and 6E in particular, in which there is shown a general framework for illustrating the methods of generating arbitrary perspective and parallel "2-D projections" of 3-D voxel-based images, respectively, in accordance with the principles of the present invention.

FIG. 6A schematically illustrates a perspective viewing process, in which in order to form a 2-D "projection" of a 3-D voxel-based image represented in a Cubic Frame Buffer in $Z_3$ space, a plurality of projection (i.e. viewing) rays are emanated (i.e. cast) from a viewpoint V along the viewing direction, into the 3-D voxel image, in order to form a 2-D "projection" thereof. In general, the "projection" comprises a set of pixel values, formed on a Projection Plane (i.e. Projection Screen) in pixel-image space. Each pixel value is the value of the non-transparent voxel encountered along a particular projection ray emanating from an observer located at viewpoint V, and extending through the 3-D voxel-based image represented in voxel space $Z^3$. Notably, the direction of the projection rays defines the general viewing direction of the projection process.

FIG. 6E schematically illustrates a parallel viewing process, which in principle is similar to the perspective viewing process but for the following difference. In the case of parallel viewing, all of the projection rays are parallel to the viewing direction and emanate from a viewpoint V located at infinity, whereas in the case of arbitrary perspective viewing, all of the projection rays emanate from the same viewpoint V located somewhere in discrete voxel space $Z^3$.

Having defined the basic terminology used hereinafter and in the claims to specify the projection process and apparatus of the present invention, it is now appropriate to describe the other principal components represented in FIG. 8.

In general, the Mechanism for Forming Projection Rays 13 retrieves (i.e. accepts) from the 3-D Memory Storage Device 12, the voxels representing the 3-D voxel-based image, and on the basis of such retrieval voxels, forms a plurality of projection rays. In principle, retrieval of these voxels from the 3-D Memory Storage Device 12 can be carried out by one of numerous possible retrieval methods, however, typically the memory storage scheme and/or memory organization of the 3-D Memory Storage Device 12 will constrain the manner in which voxels or groups of voxels can be accessed (e.g. retrieved) from the 3-D memory storage device 12.

It is noted that while in U.S. patent application Ser. No. 269,567 to Kaufman et al., the viewing direction of the voxel-based graphics system is essentially constrained and limited to the "conflict-free" storage/retrieval directions of the 3-D Memory Storage Device (e.g. Cubic Frame Buffer) for real-time viewing, there is no such requirement in the present invention. Rather, given a particular 3-D memory storage device 12 and Central Addressing Unit 11, the Mechanism for Forming Projection Rays 13 hereof will take on a different form within the principles of the present invention, and thereby provide for arbitrary parallel and/or perspective viewing of 3-D voxel-based images represented in the 3-D memory storage device 12. In any event, parallel and/or perspective viewing of the 3-D voxel-based image along an arbitrary viewing direction, is carried out independent of the "retrieval parameters" used to retrieve the voxel-data from the 3-D memory device 12.

Thus, according to projection method of the present invention, during the viewing process hereof, the voxels of the 3-D voxel-based image can be retrieved from a Cubic Frame Buffer 12, as beams of voxels along a conflict-free storage/retrieval direction thereof, referred to hereinafter as "retrieval rays". Alternatively, however, the voxels can be retrieved by other mechanisms preferably having a very short retrieval-cycle time, to ensure real-time viewing. On the basis of the plurality of voxels retrieved, a plurality of voxel-based projection rays are formed for use in either an arbitrary parallel or perspective viewing process, as the case may be, according to the present invention. On the basis of the plurality of voxel-based projection rays formed, an arbitrary 2-D projection of the 3-D voxel-based image is generated by the Ray Projection Subsystem 14. In essence, Ray Projection Subsystem 14 analyzes each projection ray formed by the Mechanism for Forming Projection Rays 13, and generates for each projection ray, the pixel value corresponding to the non-transparent voxel value closest to the viewer located at view point V. The resulting set of pixel values is then provided to the Frame Buffer 7, to form the parallel or perspective "projection" of the 3-D voxel image as viewed from the arbitrary viewing direction specified by the viewing parameters, e.g. $\Theta$, $\Phi$, r.

Referring to FIG. 9, another embodiment of the apparatus for carrying out the projection method of the present invention, is illustrated. This embodiment is indicated generally by reference numeral 10'. In FIG. 9, all of the components illustrated in FIG. 8 and described above are employed, however, the Mechanism for Forming Projection Rays 13 comprises two sub-mechanisms, namely, A Projection Ray Arrangement (PRA) Retrieval Mechanism 15 and a Mechanism For Forming Projection Rays From a Projection Ray Arrangement 16.

In this particular embodiment, the projection method hereof involves first specifying a plurality of Projection Ray Arrangements extending through discrete 3-D voxel space $Z^3$ of the Cubic Frame Buffer 12. This specification can be carried out using the Central Addressing Unit 11, as will be described in detail hereinafter with respect to the preferred embodiment hereof. Notably, the voxel-based Projection Ray Arrangements (PRA's) can be in the form of a variety of geometric objects, for example, planes, subcubes and so on, but in the preferred embodiment Projection Ray Planes are used as will be described in greater detail hereinafter with respect to FIGS. 10 through 23.

Thereafter, for each voxel-based Projection Ray Arrangement, a plurality of voxels (e.g. retrieval rays) are retrieved from the Cubic Frame Buffer 12 preferably along at least one of the conflict-free storage/retrieved axes thereof, using the PRA Retrieval Mechanism 15. On the basis of the plurality of retrieved voxels, a plurality of voxel-based projection rays are formed using the Mechanism 16 for Forming Projection Rays from a PRA. On the basis of the plurality of projection rays, an arbitrary projection is formed, using the Ray Projection Subsystem 14. After this process is carried out for each PRA, then, on the basis of the arbitrary projections so formed, an arbitrary projection of the 3-D voxel image is completely formed in the Frame Buffer 7.

Returning now to FIG. 10, an embodiment of the arbitrary projection generating apparatus of FIG. 9 is shown, and is indicated generally by reference numeral 10". In FIG. 10, each Projection Ray Arrangement is a Projection Ray Plane, and the Mechanism 16 for Forming Projection Rays from a PRA illustrated in FIG. 9, comprises a Projection Ray Formation Buffer 17 and a Projection Ray Addressing Mechanism 18 for the Projection Ray Formation Buffer 17. In all other respects, the apparatus 10" represented in FIG. 10 is similar to the apparatus 10' represented in FIG. 9.

In order to more fully appreciate, in principle, the simplicity of the apparatus for carrying out the method of generating arbitrary parallel and perspective projections of 3-D voxel-based images, reference is made to FIGS. 6A through 6H, in particular.

When carrying out the preferred method of generating arbitrary parallel projections (i.e. arbitrary parallel viewing) in accordance with the principles of the present invention, the process schematically represented in FIGS. 6E through 6H and FIG. 16 is essentially carried out to form a 2-D projection of a 3-D voxel-based image as viewed along an arbitrary viewing direction specified by viewing parameters $\Theta$ and $\Phi$.

As illustrated in FIG. 6F a plurality of parallelly disposed Projection Ray Planes are specified within a Cubic Frame Buffer 12 depending on the viewing direction from an observer assumed (for mathematical modeling purposes) to be located at V near infinity.

For arbitrary parallel viewing, two viewing parameters Θ and Φ are required to specify the viewing direction. As illustrated in FIG. 6F, the "pitch" or slope of the Projection Ray Planes with respect to the Z axis in the Y-Z plane of the Cubic Frame Buffer represented in FIG. 6F, is specified by Φ referred to hereinafter as the "PRP pitch" or the like. As the viewing direction can be to either side of the middle of each face of the Cubic Frame Buffer 7, another viewing parameter, Θ, is required to specify the parallel viewing direction, and this viewing parameter shall be referred to hereinafter as the "yaw" of the projection rays. This viewing parameter Θ is specified in FIG. 6H as the angle of each Projection Ray with respect to the Z coordinate direction of the Projection Ray Plane Buffer in the X-Z plane. Notably, in arbitrary parallel viewing, Φ and Θ are constant for each different PRP and Projection Ray, respectively, whereas in the process of arbitrary perspective viewing, Φ will be specified as a constant, while Θ is different for each Projection Ray. In any event, specification of the viewing parameters is a matter of definition and is expected to vary from embodiment to embodiment.

The next step of the projection process hereof, is to retrieve for each specified Projection Ray Plane, the voxels comprising the same, as illustrated in FIG. 6G. This PRP retrieval step requires making use of the viewing parameter Φ so that during each i-th PRP retrieval cycle, the voxels comprising a discrete representation of the i-th PRP are retrieved. To achieve this, the Central Processing Unit—in effect computes, for a particular 3-D memory storage device—having a particular memory organization and accessing capabilities, address values to applied thereto so that the voxels corresponding to the i-th PRP are read out for storage. The details of the Central Addressing Unit 11 and PRP voxel address computation on the basis of viewing parameter Φ, will be described hereinafter with respect to the preferred embodiment hereof for arbitrary parallel viewing. Thereafter, the method involves storing the retrieved voxels of the i-th PRP in the Projection Ray Plane Formation Buffer 17 shown in FIG. 10, to form a Projection Ray Plane as illustrated in FIG. 6H.

As illustrated in FIG. 6H, the voxels of each voxel-based Projection Ray Plane, which correspond to a particular Projection Ray are ordered in a particular manner dependent at least upon the "yaw angle"Θ, of a particular arbitrary parallel projection ray. In order to retrieve the voxels corresponding to each voxel-based projection ray represented within a formed voxel-based Projection Ray Plane, resort is made to the Projection Ray Addressing (i.e. Indexing) Mechanism 18 featured in the apparatus of FIG. 10. While the details associated with a particular realization of the Projection Ray Addressing Mechanism 18 will be described hereinafter with respect to the preferred embodiment hereof, it is noted that the Central Addressing Unit 11 computes, on the basis of the viewing parameter Θ, addressing data for the Projection Ray Addressing Mechanism 18, which is to be utilized in stepping along the PRP Formation Buffer 17 to track the voxels lying along each yaw-line (i.e. Projection or Viewing Ray) defined by "yaw angle"Θ, and thereby form a plurality of projection rays by carrying out this voxel-tracking process for each projection ray to be formed.

After the plurality of projection rays are formed, the Ray Projection Subsystem 14 analyzes the voxels of each formed projection ray so as to generate a pixel value to be stored in the Frame Buffer 7 in a manner described hereinbefore. After this process is carried out for each Projection Ray Plane, a scan-line of pixel values is generated for display across the Projection Plane (i.e. Projection Screen). By carrying out the above process for a plurality of Projection Ray Planes, a plurality of scan-lines are formed, thereby generating a parallel "projection" of the 3-D voxel-based image along an arbitrary viewing direction specified by viewing parameters Φ and Θ.

When carrying out the preferred method of generating arbitrary perspective projections (i.e. arbitrary perspective viewing) in accordance with the principles of the present invention, the process schematically illustrated in FIGS. 6A through 6D and FIG. 16 is essentially carried out to form a 2-D projection of a 3-D voxel-based image as viewed along an arbitrary viewing direction specified by viewing parameters Φ, Θ, and r.

As illustrated in FIG. 6B, a plurality of diverging Projective Ray Planes, are specified within the Cubic Frame Buffer 12, depending on the viewing direction from an observer assumed to be located at viewpoint V in discrete voxel space $Z^3$. For arbitrary perspective viewing employing a polar coordinate reference system in $Z^3$ space, three viewing parameters Θ, Φ, and r are required to specify the viewing direction. However, it is apparent that the viewing parameters used in a particular embodiment will be dependent on the coordinate reference system being used, and that non-polar coordinate reference systems may be used in carrying out the present invention.

As illustrated in FIG. 6C, the "pitch" or slope of the Projection Ray Plane with respect to the Z axis in the Y-Z plane, which passes through the Interest Point (I) located at the center of the Cubic Frame Buffer 12, is specified by Φ referred to hereinafter as the "PRP pitch" for the case of arbitrary perspective viewing. As the viewing direction can be either to the side of the middle of each face of the Cubic Frame Buffer 12, another viewing parameter, Θ, is required to specify the perspective viewing direction, and this viewing parameter shall be referred to hereinafter as the "yaw" of the projection rays. This viewing parameter Θ is specified in FIG. 6D as the angle of the Projection Ray passing through Interest Point I, formed with respect to a line parallel to the Z coordinate direction of the Projection Ray Plane Buffer in the X-Z plane as illustrated in FIG. 6D. An additional viewing parameter r, defined as the distance between the Interest Point I and the viewpoint V as illustrated in FIG. 6A, is also required to specify the viewing parameters for the perspective viewing process. Notably, in arbitrary perspective viewing, Φ and Θ are the pitch and yaw angles, respectively, of the "View Ray" as defined in FIG. 6A. In any event, specification of viewing parameters for the arbitrary perspective viewing process hereof is a matter of definition and is expected to vary from embodiment to embodiment, as in the case of arbitrary parallel viewing.

The next step of the arbitrary perspective projection process hereof, is to retrieve for each specified Projection Ray Plane, the voxels comprised in the same, as illustrated in FIG. 6C. As in the case of arbitrary parallel viewing, this PRP retrieval step requires making use of the viewing parameter Φand r so that during each i-th PRP retrieval cycle, the voxels comprising a discrete representation of the i-th PRP are retrieved. To achieve this, the Central Processing Unit 11 in effect computes, for a particular 3-D memory storage device 12 having a particular memory organization and accessing capabilities, address values to be applied thereto so that the voxels corresponding to the i-th PRP are read out for storage. The details of the Central Addressing Unit 11 for PRP voxel address computation on the basis of viewing parameters Φ and r, will be described hereinafter with respect to the preferred embodiment hereof for arbitrary perspective viewing.

As illustrated in FIG. 6D, the voxels of each voxel-based Projection Ray Plane, which correspond to a particular projection ray, are ordered in a particular manner dependent at least upon the "yaw angle" Θ and viewing parameter r associated with a particular arbitrary perspective projection ray. In order to retrieve the voxels corresponding to each voxel-based projection ray represented within a formed voxel-based Projection Ray Plane, resort is made to the Projection Ray Addressing (i.e. Indexing) Mechanism 18, featured in the apparatus of FIG. 10. While the details associated with the particular realization of the Projection Ray Addressing Mechanism 18 will be described hereinafter with respect to the preferred embodiment hereof, it is noted that the Central Addressing Unit 11 computes, on the basis of viewing parameters Θ and r, addressing data for the Projection Ray Addressing Mechanism 18 which is to be utilized in stepping along the PRP Formation Buffer 16 to track the voxels line along each "yaw-line" defined by "yaw angle" θ, and thereby form a plurality of projection rays by carrying out this voxel-tracking process for each projection ray to be formed.

After the plurality of projection rays are formed, the Ray Projection Subsystem 14 analyzes the voxels of each projection ray to generate a pixel value to be stored in the Frame Buffer 7 in the manner described hereinbefore. After this process is carried out for each PRP, a scan-line of pixel values is generated for display across the Projection Screen as shown in FIG. 6A. By carrying out the above process for a plurality of PRP's, a plurality of scan-lines are formed, thereby generating a perspective "projection" of the 3-D voxel-based image along an arbitrary viewing direction specified by viewing parameters Φ, Θ and r.

Figure 11A:
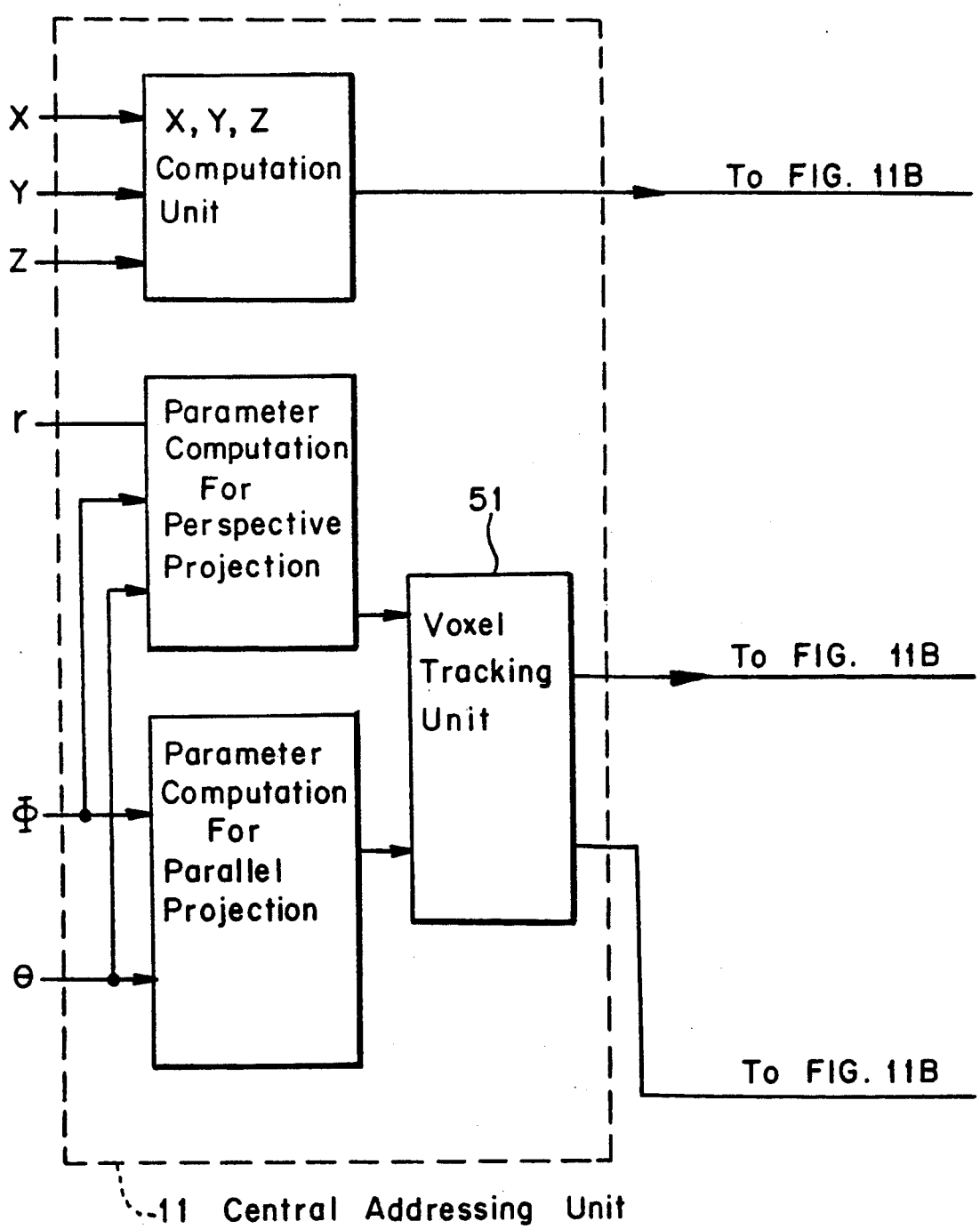
FIG. 11 is a block schematic diagram of apparatus for storing, accessing and processing voxel-based data and for generating arbitrary projections using apparatus illustrated in FIG. 10, showing the basic components of the Central Addressing Unit and the modular construction of the Cubic Frame Buffer and the Mechanism for Forming Projection Rays.
Figure 11B:
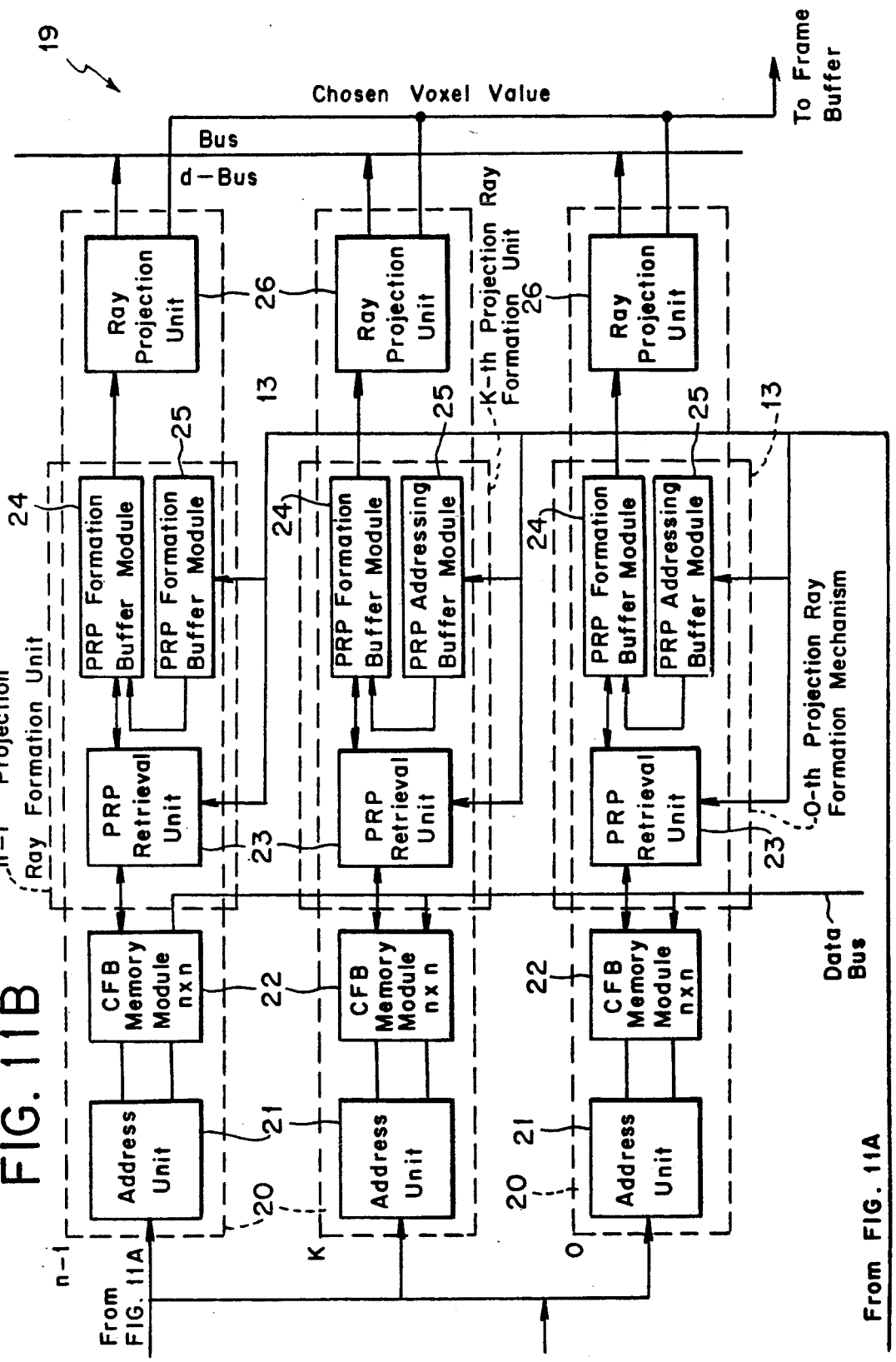

In FIG. 11, a 3-D voxel-based graphics subsystem 19 having arbitrary projection capabilities is shown, with the elements of the apparatus of FIG. 10 shown in greater detail. Specifically, the voxel-based graphics subsystem 19 illustrated therein has an overall modular structure comprising a plurality of similar modules 20 indexed k=0, 1, 2, ... n-1, a Central Addressing Unit 11, and several buses to be described in greater detail hereinafter.

In the preferred embodiment, each k-th module includes a k-th local Address Unit 21, a k-th CFB memory module 22, a k-th PRP retrieval unit, a k-th PRP Formation Buffer module 24, a k-th PRP Addressing Unit 25, and a k-th Ray Projection Unit 26. Notably, each CFB memory module 22 has nxn memory storage locations, and each PRP Formation Buffer Module 24 and PRP Addressing Buffer Module 25 has nxl storage locations.

Each k-th CFB memory module is independently accessible (i.e. addressable by the Central Addressing Unit 11), as well in cooperation with corresponding k-th local addressing unit 21.

In the preferred embodiment, each K-th memory module contains a plurality of internal memory cells, each indexed (or addressed) by internal memory cell indices (or addresses) i and j, where $0 \leq i \leq n-1$ and $0 \leq j \leq n-1$. Notably, each Ray Projection Unit 26 has the structure and function of the voxel Multiple Write Processing Unit of the apparatus described in U.S. patent application Ser. No. 269,567, and thus need not be described further.

Regarding the details of each Projection Ray Unit 26, Local Addressing Unit 21, and CFB Memory Module 22, reference is to be made to that U.S. patent application Ser. No. 269,567.

Referring now to FIGS. 12 through 16, the method and apparatus for generating arbitrary parallel and perspective projections in accordance with the principles of the present invention will now be described below.

Figure 12:
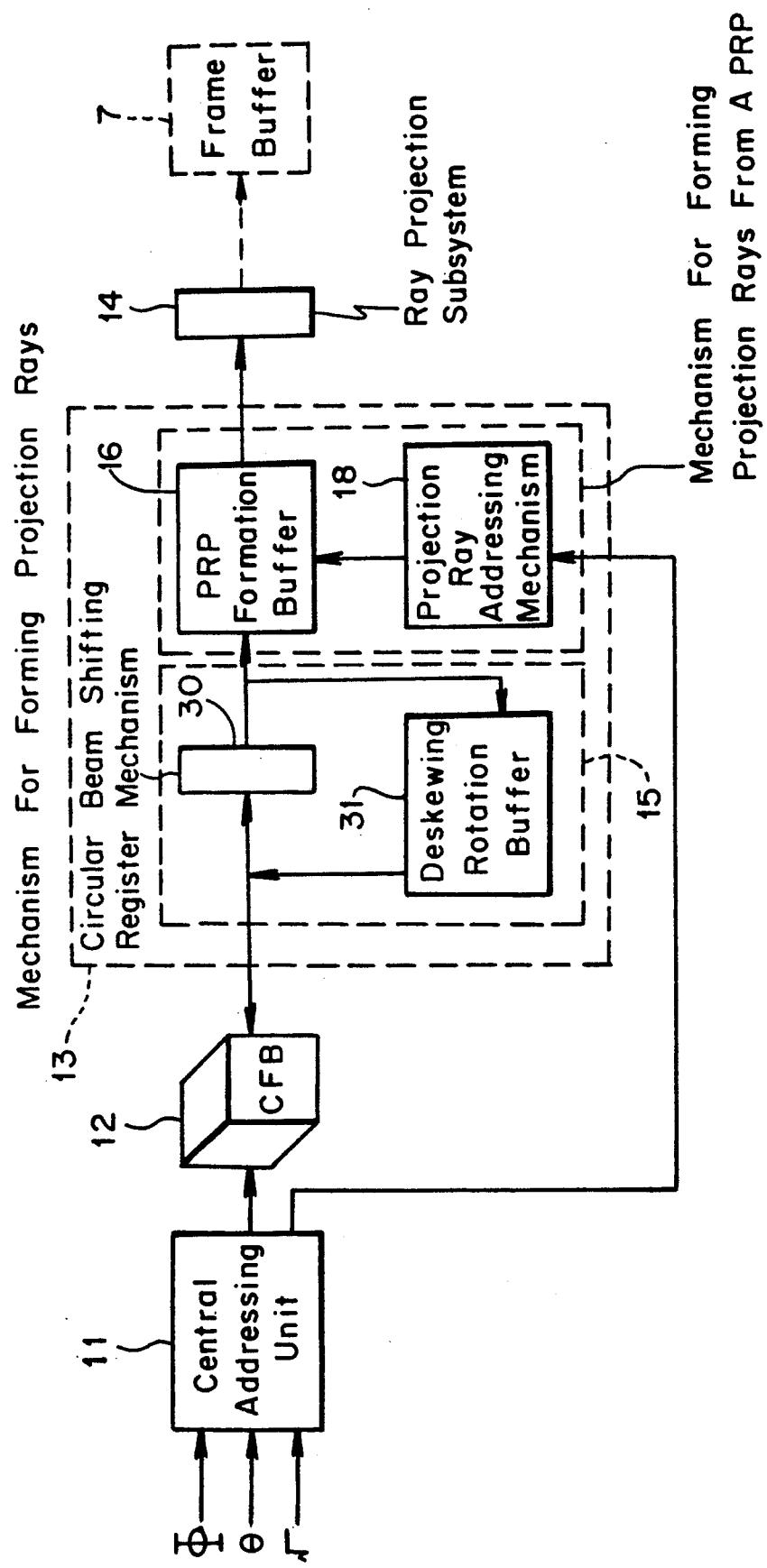
FIG. 12 is a block schematic diagram of another embodiment of apparatus for generating arbitrary projections of 3-D voxel-based images in accordance with the principles of the present invention, showing the components of the apparatus illustrated in FIG. 8, where the 3-D Memory Storage Device comprises a Cubic Frame Buffer and the Mechanism for Forming Projection Rays comprises a Circular Beam-Shifting Register Mechanism, a Deskewing (i.e. Rotation) Buffer, a Projection Ray Formation Buffer and an Addressing (i.e. Indexing) Buffer for the Projection Ray, Formation Buffer.

In the preferred embodiment, the Cubic Frame Buffer 12 of the apparatus illustrated in FIG. 12, is a 3-D memory storage device having 6 conflict-free storage/retrieval directions along the ±X, ±Y, ±Z axes hereinafter referred to as the principal storage/retrieval axes. The structure and function of this Cubic Frame Buffer 12 is described in great detail in U.S. patent application Ser. No. 269,567 and is characterized by a skewing memory storage scheme that maps the voxels of a 3-D nxnxn matrix array in $Z^3$ space, into n memory modules (i.e. banks) each containing nxn voxels, and provides for the conflict-free access to various beams of voxels parallel to the principal storage/retrieval axes. In this particular embodiment, the memory storage scheme is further characterized by the linear skewing function:

$$S(x,y,z) = k = (x+y+z) \bmod n \quad i = x \text{ and } j = y$$

where x, y and z are coordinate values of each voxel in discrete 3-D voxel space, where $0 \leq x,y,z \leq n-1$. For a more detailed description of the Cubic Frame Buffer, please refer to the above-referenced patent application.

In the preferred embodiment illustrated in FIG. 12, the Mechanism for Forming Projection Rays 13 is realized by a Circular Beam-Shifting Register Mechanism 30, a Deskewing (i.e. Rotation) Buffer 31, a Projection Ray Formation Buffer 16, and a PRP Addressing (i.e. Indexing) Buffer.

Since the voxel data in the Cubic Frame Buffer 12 hereof is "skewed" as described hereinabove, the Circular Beam-Shifting Register Mechanism 30 and the Deskewing Buffer 31 under the control of the Central Addressing Unit 11, in effect, "deskew" the voxel data in the Cubic Frame Buffer 12 so that a "deskewed" voxel-based Projection Ray Plane in $Z^3$ space is formed in the Projection Ray Plane Formation Buffer 16, after each i-th PRP retrieval cycle is carried out by the preferred projection method described hereinbefore in connection with FIGS. 6A through 6H and FIGS. 10. In order to access, for each Projection Ray Plane formed in Buffer 16, a plurality of projection rays, the Central Addressing Unit 11 computes on the basis of viewing parameters, nxn PRP retrieving addresses for storage in the PRP Addressing Mechanism 18. On the basis of PRP retrieving addresses, each projection ray represented in the PRP Formation Buffer 16 is accessed therefrom and provided to the Ray Projection Subsystem 14 for analysis as described hereinbefore, to produce a pixel value. For each retrieved Projection Ray Plane being processed as described hereinabove, a scan-line comprising a plurality of pixels is generated, and for n retrieved and processed voxel-based Projection Ray Planes, an entire 2-D "projection" of the 3-D voxel-based image is generated.

Figure 13A:
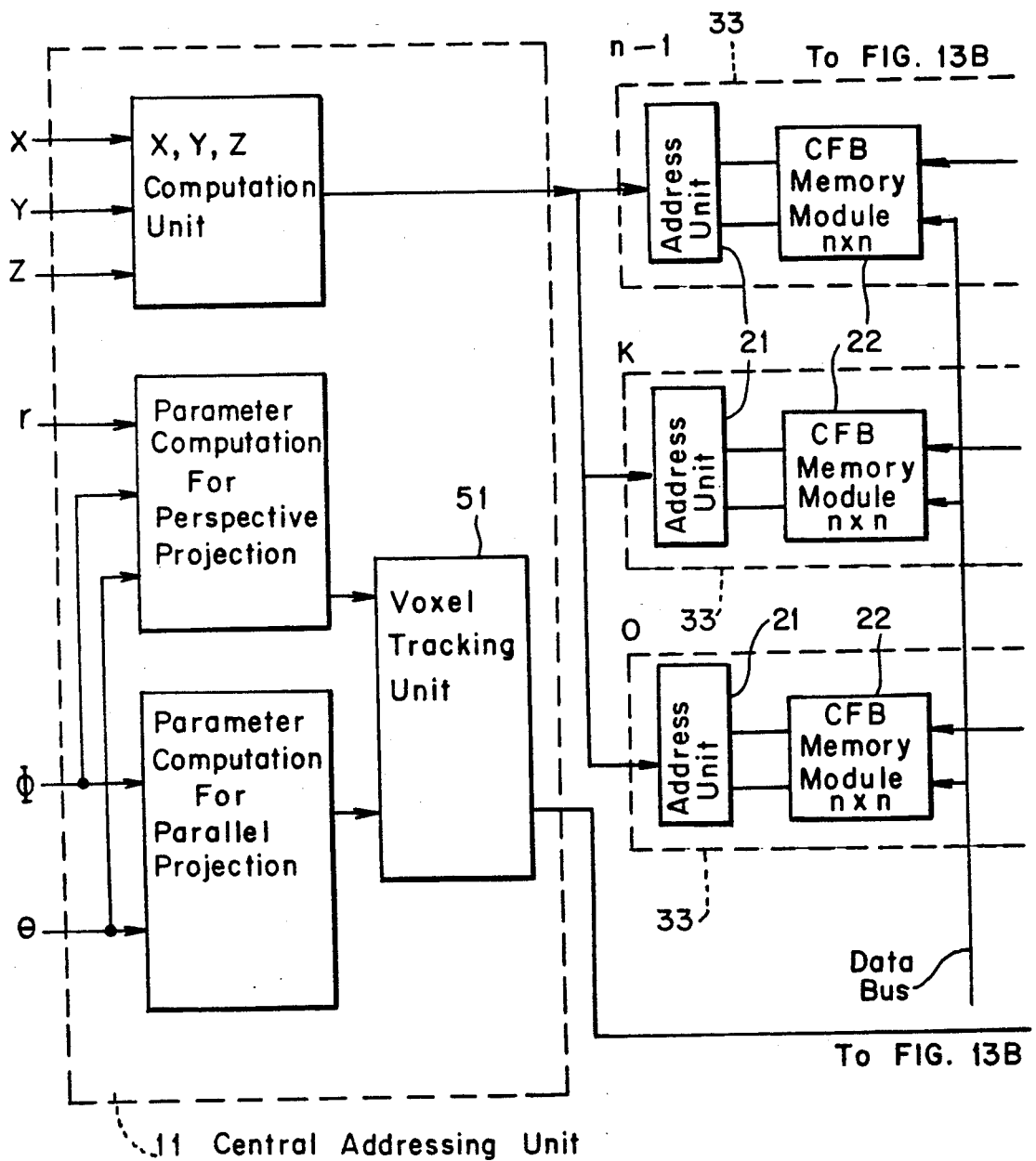
FIG. 13 is a block schematic diagram of apparatus for storing, accessing and processing voxel-based data and for generating arbitrary projections using the apparatus illustrated in FIG. 12, showing the components of the Central Addressing Unit and the modular structure of the Cubic Frame Buffer, the Mechanism for Forming Projection Rays and the Ray Projection Subsystem.
Figure 13B:
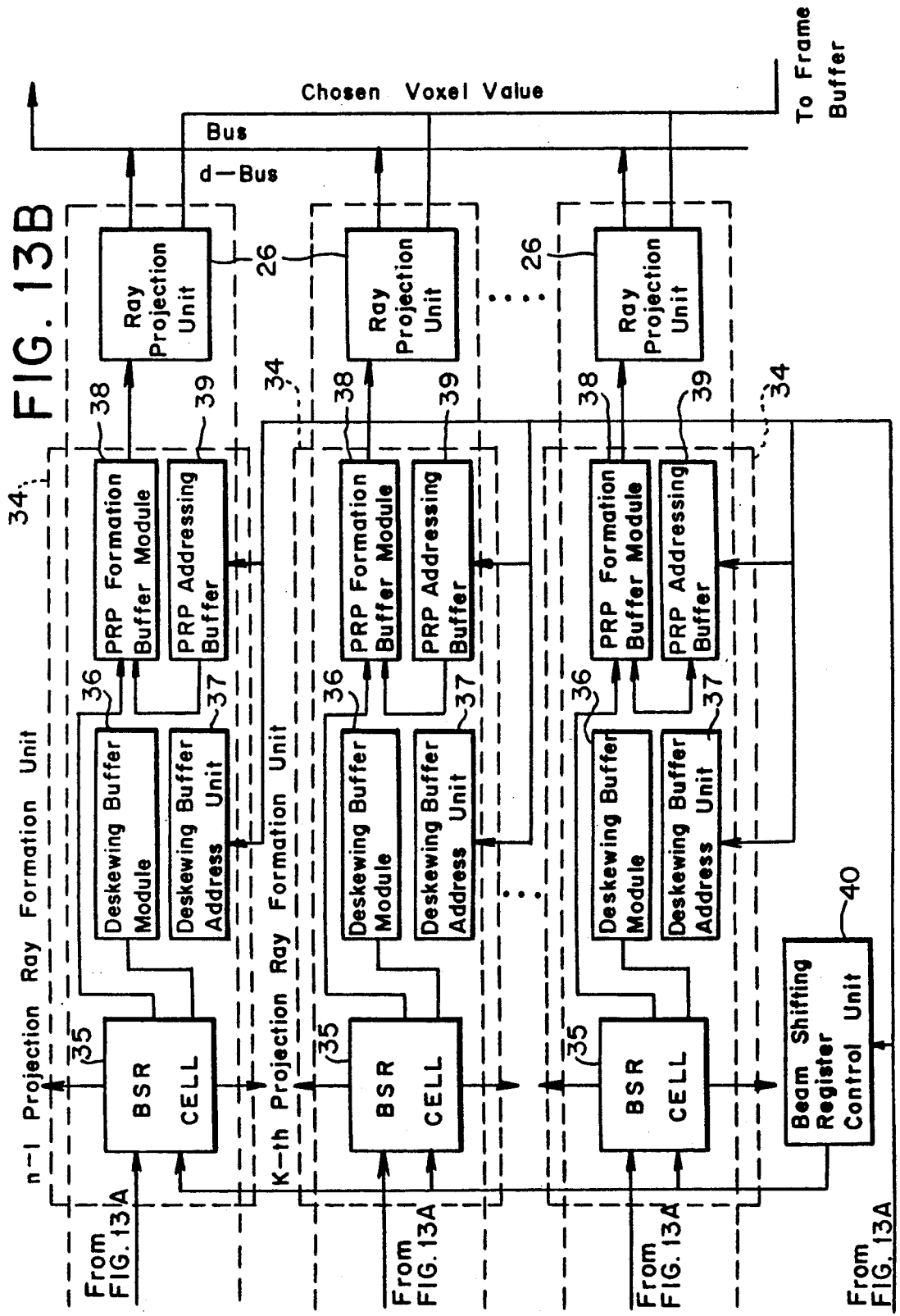

In FIG. 13, a 3-D voxel-based graphics subsystem 32 having arbitrary projection capabilities is shown, with the elements of the apparatus of FIG. 12 illustrated in greater detail. Specifically, the voxel-based graphics subsystem 32 has an overall modular structure comprising a plurality of similar modules 33 indexed k=0, 1, ... n-1, a Central Addressing Unit 11 and several buses to be described hereinafter in greater detail.

In the preferred embodiment, each k-th module 33 includes a k-th local address unit 21, a k-th CFB Memory Module 22, k-th Projection Ray Formation Unit 34, and a Ray Projection Unit 26. Each k-th Projection Ray Formation Unit 34 comprises a Beam-Shifting Register (BSR) Cell 35, a Deskewing (i.e. Rotation) Buffer Module 36, a Deskewing Buffer Address Unit 37, a Projection Ray Plane (PRP) Formation Buffer Module 38, and a PRP Addressing Buffer Unit 39. Notably, each CFB Memory Module 22 has n×n memory storage locations, and each Deskewing Buffer Module 36, PRP Formation Buffer Module 38, and PRP Addressing Buffer Module 39 has n×1 storage locations.

As in the embodiment illustrated in FIG. 11, each k-th CFB Memory Module is independently accessible (i.e. addressable) by the Central Addressing Unit 11, as well as in cooperation with corresponding k-th local addressing unit 21.

Each Beam-Shifting Register Cell 35 is capable of holding a single voxel value of a voxel beam (e.g. retrieval ray), and is in communication with a Beam-Shifting Register Control Unit 40 by way of a common bus. Each BSR Cell 35 is connected to the control unit in such a manner that during a single "Beam-Shifting Cycle", each voxel in a particular BSR Cell 35 is caused to undergo a predetermined shift controlled by the Beam-Shifting Register Control Unit 40, and thus it achieves a "circular beam-shifting operation". As illustrated in FIG. 13, Beam-Shifting Register Control Unit 40 is controlled by Central Addressing Unit 11.

For each k-th module 33, the Deskewing Buffer Module 36 has its own local Deskewing Buffer Addressing Unit 37, and the PRP Formation Buffer Module 38 has its own local PRP Buffer Addressing Unit 39, as well. Notably, each k-th Deskewing Buffer Addressing Unit 37 and PRP Formation Buffer Addressing Unit 39, is independently controlled by the Central Addressing Unit 11 as will be described hereinafter in greater detail.

Referring now to FIG. 14, the k-th Projection Ray Formation Unit 34 of the Mechanism 13 of apparatus 32 illustrated in FIG. 13, is shown in greater detail. In particular, each Projection Ray Formation Unit 34 comprises Beam-Shifting Register Cell 35, Deskewing Buffer Module 36, Deskewing Buffer Address Unit 37, PRP Formation Buffer Module 38, and PRP Addressing Buffer Unit 39.

Referring to FIGS. 13 and 14, the Circular Beam-Shifting Mechanism 30 comprises n Beam-Shifting Register Cells 35 controlled by Beam-Shifting Control Unit 40, and interconnected in a manner illustrated in FIG. 14 and described below. As shown in FIG. 14, each Beam-Shifting Register Cell 35 includes a Multiplexer 41 and a Beam-Shifting Memory Cell 42. Each Beam-Shifting Memory Cell 42 is connected to its local multiplexer 41 as illustrated in FIG. 14, and has an output designated by "BS out (k)" as shown therein. In the preferred embodiment of FIG. 14, each k-th multiplexer 41 is provided with (i) $2\log_2(k)-1$ number of "BS outputs" from other BSR Memory Cells of the Circular Beam-Shifting Mechanism 30, (ii) the output value provided from its local Deskewing Buffer Module 43, and (iii) the output from the k-th CFB Memory Module 22. Notably, the Circular Beam-Shifting Register Mechanism 30 hereof is a modified form of the "Barrel Shifter" known in the computer art.

The Deskewing Buffer Address Unit 37 in the preferred embodiment, is realized by a combination of basic elements which carry out one of two demapping functions based upon the linear skewing function $S(x,y,z)=(x+y+z) \mod n$. In the preferred embodiment, the Deskewing Buffer Address Unit 37 provides to the Deskewing Buffer Module 36, either (i) an address broadcasted over bus B by the Central Addressing Unit 11, or (ii) an address of a locally computed address equal to "(k-broadcasted address)mod n". Notably, the value k is prestored in each respective K-th module in a k module index register 48, and is available for the above-described computation. Preferably, each Deskewing Buffer Module 36 is realized by a conventional memory device with n storage cells, each cell being capable of holding a single voxel value of a predetermined bit-representation, common to all other voxel-storing devices used in realizing the components of the apparatus hereof.

As illustrated in FIG. 14, each k-th PRP Formation Buffer module 38 includes a PRP-Formation Addressing Buffer 44, a PRP Formation Data Buffer 45, a first two-way multiplexer 46, a second two-way multiplexer 47 and Blank-Value Storage Register 48. The first two-way multiplexer 46 provides address values "A" to the PRP-Formation Data Buffer 45, from either (i) the PRP-Formation Address Buffer 44, which holds a prestored address value "$A_1$" broadcasted over bus B by the Central Addressing Unit 11, or (ii) a locally provided address value "$A_2$" provided by the PRP Addressing Buffer 39. The second two-way multiplexer 47 transfers to the k-th Ray Projection Unit 26, either (i) a voxel data value from the PRP-Formation Buffer 45 or (ii) a "blank" voxel value from Storage Register 48. The locally provided address value "$A_2$" is preferably computed in the Central Addressing Unit 11 during initialization procedures, is transferred over bus B, and is stored in the k-th PRP Addressing Module 49, in accordance with addressing data stored in a PRP Addressing Data Buffer 50.

Notably, in connection with the apparatus of FIG. 13 and the Projection Ray Formation Unit 54 illustrated in FIG. 14, control lines, bus B and like have been eliminated to avoid obfuscation of the data transfer paths of the preferred embodiment of the present invention. Such control lines and bus B emanate from the Central Addressing Unit 11 and are determined by algorithms to be described hereinafter in detail.

Also, all data paths for transferring voxel-data are assumed to be of width sufficient to transfer voxel data of a predetermined bit-representation, referred to as the "voxel word length".

Having described hereinabove the preferred embodiment of the Mechanism for Forming Projection Rays 13 generally illustrated in FIG. 12, it is appropriate at this juncture to now described the role and operation thereof in connection with carrying out the method of generating either arbitrary parallel or perspective projections in accordance with the principles of the present invention.

During the projection process of the present invention, the skewed voxel data corresponding to a specified voxel-based Projection Ray Plane is (i) accessed beam by beam from the Cubic Frame Buffer 12, (ii) processed by the Projection Ray Formation Mechanism 13, and (iii) stored in the Projection Ray Plane Formation Buffer 16 in an unskewed fashion, so that each i-th projection ray can be retrieved in parallel for processing in the Ray Projection Subsystem 14 as described hereinbefore. The deskewing of the beams of voxel data is carried out by a two-phase process.

During Phase I, each i-th beam of voxels (i.e. retrieval ray) forming a segment of the current j-th Projection Ray Plane, is processed in the following manner:

(1) each i-th voxel-based retrieval ray (i.e. beam) is accessed (i.e. retrieved) from the Cubic Frame Buffer 12 organized in 3-D skewed memory storage space $M^3$, and stored in the circular Beam-Shifting Register 30;

(2) the i-th retrieval ray is then shifted by the Circular Beam-Shifting Register Mechanism 30 so as to partially deskew the voxel data thereof; and (3) the shifted retrieval ray is then stored in the Deskewing Buffer 31.

Figure 15:
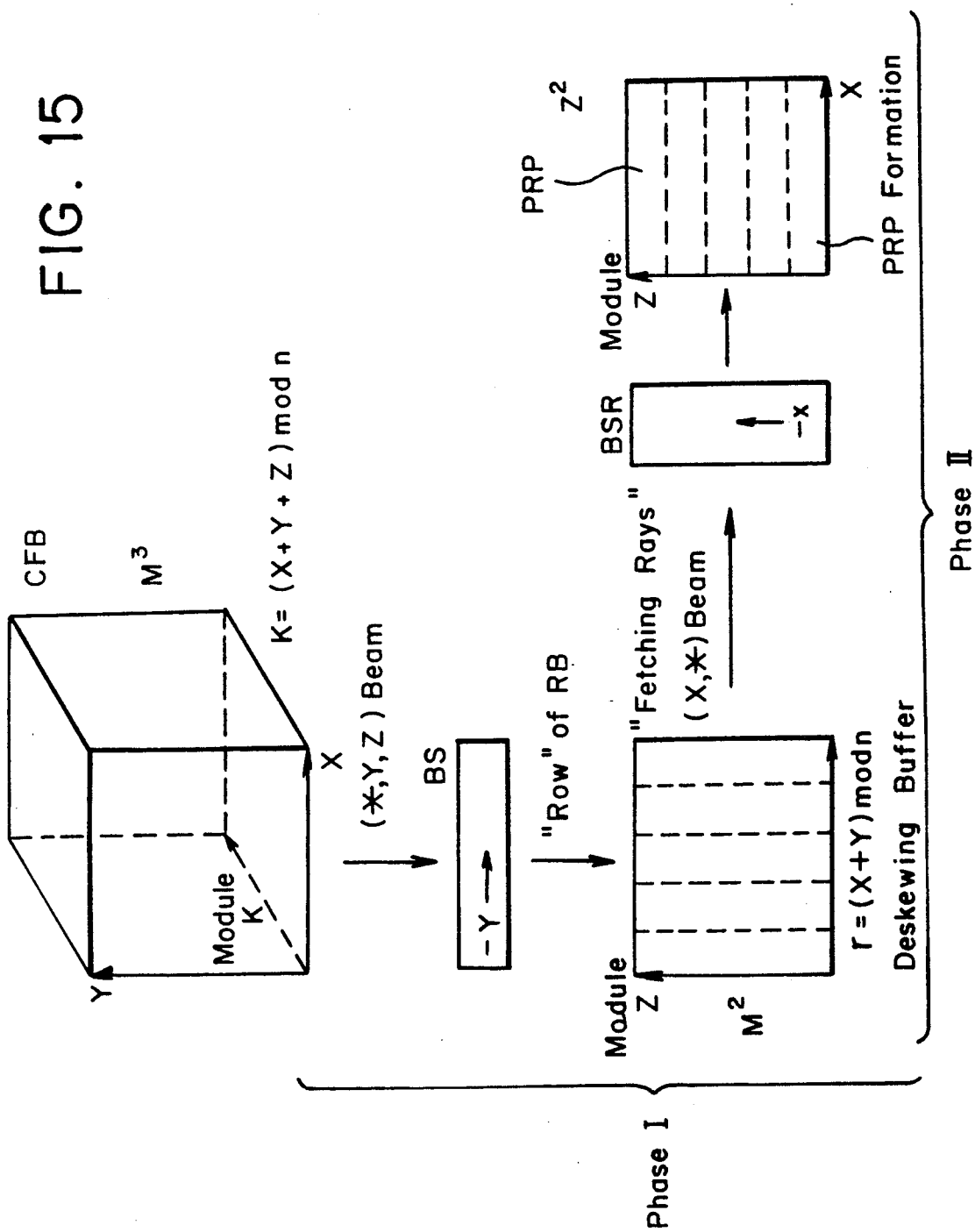
FIG. 15 is a schematic representation of the process of deskewing voxel data retrieved from a Cubic Frame Buffer organized according to a skewed memory storage scheme providing for conflict-free retrieval along the orthographic axes thereof, and in which voxel data corresponding to a Projection Ray Plane is formed in voxel space as a result of such process.

As a result of this process, the Deskewing Buffer 31 schematically represented in FIG. 15, is filled with an nxn "partially skewed" voxel-based representation of the j-th Projection Ray Plane.

In step (2), the shifting of the beam (i.e voxel-based retrieval ray) is in effect demapped along one of the coordinate directions in $Z^3$ space, and the amount of shift required to do so is based upon the 3-D skewed memory storage scheme utilized by the Cubic Frame Buffer 12.

In step (3), the i-th beam of voxels (i.e. the i-th according to a 2-D skewed memory storage scheme, which provides for simultaneous access to the voxels of n voxel-based "fetching rays" along two fetching directions extending through the 2-D skewed memory storage space $M^2$ of the Deskewing Buffer 31.

During Phase II, each i-th voxel-based fetching ray is processed in 2-D skewed memory storage space $M^2$, in the following manner:

(1) each i-th fetching ray is accessed (i.e. retrieved) from the Deskewing Buffer 31 organized in 2-D skewed memory storage space $M^2$, and stored in the Beam-Shifting Register 30;

(2) the i-th fetching ray is then shifted by the Circular Beam Shifting Register Mechanism 30 so as to demap the i-th fetching ray along the other coordinate directions; and (3) the shifted (i.e. demapped) i-th fetching ray is then stored in the PRP Formation Buffer 16 in an unskewed discrete 2-D voxel space $Z^2$ format.

Notably, the demapping operation for each i-th fetching ray in step (2) above, is based on the 2-D skewed memory storage scheme of the Deskewing Buffer 31.

After each j-th Projection Ray Plane has been formed in PRP Formation Buffer 16, as described above, the Mechanism 18 accesses for each i-th projection ray, the discrete voxel-based representation thereof which resides in the PRP Formation Buffer 16 according to the precomputed address values stored in the PRP Addressing Buffer 39. Then, the i-th Projection Ray is provided to the Ray Projection Subsystem 14 for pixel value generation as described hereinbefore.

Referring now to FIGS. 17 through 21, and FIGS. 12 through 13, the method of generating an arbitrary parallel projection according to the principles of the present invention, will now be described as follows.

In FIG. 20, a computer program in pseudo-c language is shown and serves in the preferred embodiment hereof, to carry out the projection method. As illustrated therein, several other computer subprograms are invoked during the projection process for carrying out supporting functions, many of which have been described hereinbefore.

In the preferred embodiment of the arbitrary parallel projection process, a constraint is imposed on the Projection Ray Planes, i.e. that they are parallel to at least one principal axis of the Cubic Frame Buffer. However, this is not a severe limitation because the Projection Screen (shown in FIG. 6A and 6E) can always be rotated (i.e. rolled) so as to make the Projection Ray Planes obey the constraint. This will cause rotation of the resulting "projection". If required or desired by the user, this rotation can be simply corrected on the 2-D image using standard algorithm for image rotation well known in the art.

Prior to accessing of the retrieval rays of a Projection Ray Plane, the subroutine of FIG. 20 calls subroutine 21 to carry out initialization of the PRP Formation Addressing Buffer 39. This initialization process involves computing for a single Projection Ray Plane, the address values of the voxels comprising a discrete voxel-based representation of each projection thereof, using the subroutines of FIG. 17 and 18. However, since all projection rays are parallel and the Projection Ray Planes are constrained to be parallel to a principal storage/retrieval axis, the address values computed for one Projection Ray Plane can be used for all Projection Ray Planes during the projection process hereof.

In order to retrieve the retrieval rays of a Projection Ray Plane, it is necessary to first determine the "intersection point" between each Projection Ray Plane, and the wall of the Cubic Frame Buffer 12 which is closest to the viewer located at viewpoint V, as illustrated in FIG. 6F. Given the "intersection point", the subroutine of FIG. 17 computes on the basis of viewing parameter Φ, the coordinate values of the "pitch line" of each PRP, which corresponds to end coordinate values of the voxel-based retrieval rays to be retrieved from the Cubic Frame Buffer 12. Notably, this end-coordinate determination process is a voxel-tracking process, and is schematically represented within the Central Addressing Unit 11 of FIGS. 11 and 13, as a voxel tracking unit 51. In essence, subroutines 17 and 18 carry out a modified form of a non-integer end point Bresenham scan-conversion algorithm well known in the art.

Thereafter, the program of FIG. 20 calls the subroutine of FIG. 19 in order to carry out the processing steps involved in Phases I and II of the Projection Ray Formation Mechanism 15, and the processing steps carried out by the Ray Projection Subsystem 14, hereinbefore described.

Referring now to FIGS. 17, 18, 19, 22 and 23, the method of generating an arbitrary perspective projection according to the principles of the present invention, will now be described as follows.

In FIG. 22, a computer program in pseudo-C language is shown and serves in the preferred embodiment hereof, to carry out the perspective projection method. As illustrated therein, several other computer subprograms are invoked during the projection process for carrying out supporting functions, many of which have been described hereinbefore.

Prior to the retrieval of retrieval rays of a Projection Ray Plane, the subroutine of FIG. 22 calls subprogram 23 to carry out initialization of the PRP Formation Addressing Buffer 39. This initialization process involves computing for each j-th Projection Ray Plane, the address values of the voxels comprising a discrete voxel-based representation of each projection ray thereof. However, if the perspective view is distorted slightly by making the Projection Screen in FIG. 6A parallel to the X-Y plane therein, then there is no need to recompute for the PRP Formation Addressing Buffer 39, the address values for subsequent (e.g. 1, 2, 3 ... n-1) Projection Ray Planes. If required or desired by the user, the above distortion can be later corrected on the resulting 2-D "projection" using a "linear stretching" algorithm known in the art.

Retrieval of the retrieval rays of each Projection Ray Plane is carried out in a manner similar to that performed for arbitrary parallel projection, except that calculation of the "intersection point" and "pitch" of each Projection Ray Plane is carried out as specified in the program of FIG. 22.

Thereafter, the program of FIG. 22 calls the subroutine of FIG. 19 in order to carry out the processing steps involved in Phases I and II of the Projection Ray Formation Mechanism 15, and the processing steps carried out by the Ray Projection Subsystem 14, hereinbefore described.

While the particular embodiments shown and discussed hereinabove have proven to be useful in many applications in the computer art, further modifications of the present invention hereindisclosed will occur to persons skilled in the art to which the present invention pertains, and all such modifications are deemed to be within the scope and spirit of the present invention defined by the appended claims.

What is claimed is:

1. A method for viewing a 3-D voxel-based image represented in discrete 3-D voxel space, said method comprising the steps of:
   (a) retrieving the voxels of said 3-D voxel-based image along at least one retrievel direction using retrieval parameters; and
   (b) along any arbitrary viewing direction specificable by viewing parameters, viewing said 3D voxel-based image in said discrete 3-D voxel space, independent of said retrieval parameters; and
   (c) storing said 3-D voxel image is said discrete 3-D voxel space according to a first skewed memory storage scheme which provides for said simultaneous accessing of said plurality of voxels along at least one said retrieval direction so as to form a plurality of voxel based retrieval rays, said first skewed memory storage scheme involving mapping the voxels of said 3-D voxel-based image in said discrete 3-D voxel space into a first skewed memory storage space.

2. The method of claim 1, wherein said 3-D voxel space is specified in terms of coordinate directions, and wherein step (a) comprises, for each said voxel-based retrieval ray,
   (i) accessing from said first skewed memory storage space, said voxels of said voxel-based retrieval ray, and
   (ii) demapping said voxel-based retrieval ray along at least one of said coordinate directions, said demapping being based upon said skewed memory storage scheme, and
   (iii) storing each said demapped retrieval ray in a second memory storage space according to a 2-D skewed memory storage scheme, said second skewed memory storage space providing for simultaneous access to the voxels of a plurality of voxel-based fetching rays along a plurality of fetching directions extending through said second skewed memory storage space, and wherein step (b) comprises, for each said voxel-based fetching ray in said second skewed memory storage space,
   (i) accessing from said second skewed memory storage space, said voxels of said voxel-based fetching ray,
   (ii) demapping said voxel-based fetching ray along another said coordinate direction, said demapping being based upon said 2-D skewed memory storage scheme, and
   (iii) storing each said demapped fetching ray in said discrete 3-D space, whereby a plurality of voxel-based viewing rays is formed on the basis of said plurality of retrieval rays, wherefrom said 3-D voxel-based image can be viewed along said arbitrary viewing direction independent of said retrieval directions.

3. The method of claim 2, wherein step (b) further comprises,
   for each viewing ray,
   analyzing said viewing ray so as to determine the first non-transparent voxel along said viewing ray which is closest to an observer viewing said 3-D voxel-based image.

4. A method of generating an arbitrary projection of a 3-D voxel-based image represented in discrete 3-D voxel space, said 3-D voxel space providing for access to the voxels along a plurality of retrieval directions extending through said 3-D voxel space, said method comprising the steps:
   (a) retrieving a plurality of voxels along at least one said retrievel direction;
   (b) (i) forming a plurality of projection ray planes on the basis of said plurality of retrieved voxels,
   (ii) forming said plurality of voxel-based projection rays on the basis of said plurality of projection ray planes formed in substep (b) (i); and
   (c) generating said arbitrary projection of said 3-D voxel based image on the basis of said plurality of voxel-based projection rays.

5. A method for generating an arbitrary projection of a 3D voxel-based image represented in discrete 3-D voxel space, said 3-D voxel space providing for access to the voxels along a plurality of retrieval directions extending through said 3-D voxel space, said method comprising the steps:
   (a) retrieving a plurality of voxels along at least one said retrieval direction;
   (b) (i) forming a plurality of voxel-based retrieval rays on the basis of said plurality of retrieved voxels;
   (ii) forming a plurality of voxel-based projection rays on the basis of said plurality of voxel-based retrieval rays; and
   (c) generating said arbitrary projection of said 3-D voxel-based image on the basis of said plurality of voxel-based projection rays.

6. The method of claim 5, wherein substep (b)(i) comprises forming a plurality of projection ray arrangements on the basis of said plurality of voxel-based retrieval rays, and substep (b)(ii) comprises forming a plurality of voxel-based projection rays on the basis of said plurality of projection ray arrangements formed in step (b)(i).

7. The method of claim 5, wherein substep (b)(i) comprises (A) forming a plurality of projection ray planes on the basis of said plurality of voxel-based retrieval rays, and substep (b)(ii) comprises (B) forming a plurality of voxel-based projection rays on the basis of said plurality of projection ray planes formed in step (b)(ii).

8. The method of claim 7, wherein step (c) comprises, for each said projection ray in said projection ray plane, analyzing said projection ray so as to determine the first non-transparent voxel along said projection ray which is closest to an observer viewing said 3-D voxel-based image, thereby generating said arbitrary projection thereof.

9. The method of claim 8, wherein step (a) comprises simultaneously accessing said plurality of voxels along at least one said retrieval direction, so as to form said plurality of voxel-based retrieval rays.

10. The method of claim 1, which further comprises storing said 3-D voxel-based image in said discrete 3-D voxel space according to a first skewed memory storage scheme, which provides for said simultaneous accessing of said plurality of voxels along at least one said retrieval direction, sand first skewed memory storage scheme involving mapping the voxels of said 3-D voxel-based image in said discrete 3-D voxel space, into a first skewed memory storage space.

11. The method of claim 10, wherein step (a) comprises retrieiving said plurality of voxels along at least one of said retrieval directions in said 3-D voxel space by demapping said voxels from said first skewed memory storage space, into said 3-D voxel space.

12. The method of claim 10, wherein said 3-D voxel space is specified in terms of coordinate directions, and wherein step (a) comprises, for each said voxel-based retrieval ray, (i) accessing from said first skewed memory storage space, said voxels of said voxel-based retrieval ray, and (ii) demapping said voxel-based retrieval ray along at least one of said coordinate directions, said demapping being based upon said skewed memory storage scheme, and (iii) storing each said demapped retrieval ray in a second memory storage space according to a 2-D skewed memory storage scheme, said second skewed memory storage space providing for simultaneous access to the voxels of a plurality of voxel-based fetching rays along a plurality of fetching directions extending through said second skewed memory storage space, and wherein step (b) comprises, for each voxel-based fetching ray in said second skewed memory storage space, (i) accessing from said second skewed memory storage space, said voxels of said voxel-based fetching ray, (ii) demapping said voxel-based fetching ray along another coordinate direction, said demapping being based upon said 2-D skewed memory storage scheme, and (iii) storing each said demapped fetching ray in said discrete 3-D space, whereby a plurality of voxel-based projection rays is formed on the basis of said plurality of retrieval rays.

13. A method for generating an arbitrary projection of a 3-D voxel-based image represented in discrete 3-D voxel space, said 3-D voxel space providing for access to the voxels along a plurality of retrieval directions extending through said discrete 3-D voxel space, said method comprising the steps of:

(a) specifying a plurality of voxel-based projection ray planes extending through said discrete 3-D voxel space;

(b) for each said voxel-based projection ray plane, (i) retrieving a plurality of voxels along at least one said retrieval direction, (ii) forming a plurality of voxel-based projection rays on the basis of said plurality of retrieved voxels in step (i), and (iii) generating an arbitrary projection of said voxel-based projection ray plane, on the basis of said plurality of voxel-based projection rays; and (c) on the basis of said arbitrary projections of said voxel-based projection ray planes, forming said arbitrary projection of said 3-D voxel-based image.

14. The method of claim 13, wherein step (b)(iii) comprises, for each said projection ray in said projection ray plane, analyzing said projection ray so as to determine the first non-transparent voxel along said projection ray which is closest to an observer viewing said 3-D voxel-based image, thereby generating said arbitrary projection of said projection ray plane.

15. The method of claim 14, wherein step (b)(i) comprises simultaneously accessing said plurality of voxels along at least one said retrieval direction, so as to form said plurality of voxel-based retrieval rays.

16. The method of claim 15, which further comprises storing said 3-D voxel-based image in said discrete 3-D voxel space according to a 3-D skewed memory storage scheme, which provides for said simultaneous accessing of said plurality of voxels along at least one said retrieval direction, said 3-D skewed memory storage scheme involving mapping the voxels of said voxel-based image in said discrete 3-D voxel space, into a 3-D skewed memory storage space.

17. The method of claim 16, wherein substep (b)(i) comprises retrieving said plurality of voxels along at least one of said retrieval directions in said 3-D voxel space by demapping said voxels from said 3-D skewed memory storage space, into said 2-D voxel space.

18. The method of claim 16, wherein said 3-D voxel space is specified in terms of coordinate directions, and wherein substep (b)(i) comprises, for each said voxel-based projection plane, (i) accessing from said 3-D skewed memory storage space, said voxels of said voxel-based retrieval ray, and (ii) demapping said voxel-based retrieval ray along at least one of said coordinate directions, said demapping being based upon said 3-D skewed memory storage scheme, and (iii) storing each said demapped retrieval ray in a 2-D memory storage space according to a 2-D skewed memory storage scheme, said 2-D skewed memory storage space providing for simultaneous access to the voxels of a plurality of voxel-based fetching rays along a plurality of fetching directions extending through said 2-D skewed memory storage space, and wherein substep (b)(ii) comprises, for each said voxel-based fetching ray in said 2-D skewed memory storage space, (i) accessing from said 2-D skewed memory storage space, said voxels of said voxel-based fetching ray, (ii) demapping said voxel-based fetching ray along another coordinate direction, said demapping being based upon said 2-D skewed memory storage scheme, and (iii) storing each said demapped fetching ray in said discrete 2-D voxel space, whereby a plurality of voxel-based projection rays is formed on the basis of said plurality of retrieved voxels.

19. Apparatus for generating an arbitrary projection of a 3-D voxel-based image represented in discrete 3-D voxel space, said arbitrary projection being characterized by a plurality of projection rays passing through said 3-D voxel space, said apparatus comprising:

retrieving means for retrieving the voxels of a plurality of voxel-based retrieval rays extending through said 3-D voxel space;

formation means for forming a plurality of voxel-based projection rays on the basis of said plurality of retrieval rays;

generating means for generating said arbitrary projection of said 3-D voxel-based image on the basis of said plurality of voxel-based projection rays; and memory storage and accessing means for storing according to a 3-D skewed memory storage scheme, said 3-D voxel-based image represented in said discrete 3-D voxel space, and for providing simultaneous access to said plurality of voxels disposed along at least one retrieved direction in said discrete 3-D voxel space, said 3-D skewed memory storage scheme involving mapping of the voxels of the said 3-D voxel-based image in said discrete 3-D voxel space, into a first skewed memory storage space.

20. Apparatus for generating an arbitrary projection of a 3-D voxel-based image represented in discrete 3-D voxel space, said arbitrary projection being characterized by a plurality of projection rays passing through said 3-D voxel space, said apparatus comprising:

specification means for specifying a plurality of voxel-based projection ray planes extending through said discrete 3-D voxel space;

retrieving means for retrieving from each said voxel-based projection, ray planes a plurality of voxel-based retrieval rays extending along at least one such retrieval direction;

projection ray formation means for forming a plurality of voxel-based projection rays on the basis of said plurality of retrieval rays;

generating means for generating said arbitrary projection of said 3-D voxel-based image, on the basis of said plurality of voxel-based projection rays; and projection plane formation means for forming said arbitrary projection of said 3-D voxel-based image on the basis of said generated arbitrary projections of said voxel-based projection planes.

21. The apparatus of claim 20, wherein said retrieving means comprises:

conflict-free retrieving means for simultaneously retrieving along at least one conflict-free retrieval direction, the voxels of said voxel-based retrieval rays extending through said discrete 3-D voxel space.

22. The apparatus of claim 20, which further comprises memory storage and accessing means for storing according to a 3-D memory storage scheme, said 3-D voxel-based image represented in said discrete 3-D voxel space, and for providing simultaneous access to said plurality of voxels disposed along at least one retrieval direction in said discrete 3-D voxel space, said 3-D skewed memory storage scheme involving mapping of the voxels of said 3-D voxel-based image in said discrete 3-D voxel space, into a first skewed memory storage space.

23. The apparatus of claim 22, wherein said 3-D voxel space is specified in terms of coordinate directions, and wherein said retrieving means comprises first accessing means for simultaneously accessing from said first skewed memory storage space, said voxels of each said voxel-based retrieval ray, first demapping means for demapping each said voxel-based retrieval ray along at least one of said coordinate directions, said demapping being based upon said 3-D skewed memory storage scheme, and first storage means for storing each said demapped retrieval ray in a second memory storage space according to a 2-D skewed memory storage scheme, said second skewed memory storage space providing for simultaneous access to the voxels of a plurality of voxel-based fetching rays along a plurality of fetching directions extending through said second skewed memory storage space, and wherein said formation means comprises second accessing means for simultaneously accessing from said second skewed memory storage space, said voxels of each said voxel-based fetching ray, second demapping means for said voxel-based fetching ray along another coordinate direction, said demapping being based upon said 2-D skewed memory storage scheme, and second storage means for storing each said demapped fetching ray in said discrete 3-D space, whereby a plurality of voxel-based projection rays is formed on the basis of said plurality of retrieval rays.

24. The apparatus of claim 23, wherein said generating means comprises analyzer means for analyzing each said projection ray so as to determine the first non-transparent voxel along said projection ray which is closest to an observer viewing said 3-D voxel-based image, and projection formation means for forming said arbitrary projection of said 3-D voxel image on the basis of said first non-transparent voxels determined by said analyzer means.

* * * * *